US012093801B1

(12) United States Patent
Heaton et al.

(10) Patent No.: US 12,093,801 B1
(45) Date of Patent: *Sep. 17, 2024

(54) NEURAL NETWORK PROCESSING BASED ON SUBGRAPH RECOGNITION

(71) Applicant: Amazon Technologies, Inc., Seattle, WA (US)

(72) Inventors: Richard John Heaton, San Jose, CA (US); Randy Renfu Huang, Morgan Hill, CA (US); Ron Diamant, Albany, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/142,952

(22) Filed: May 3, 2023

Related U.S. Application Data

(63) Continuation of application No. 16/219,760, filed on Dec. 13, 2018, now Pat. No. 11,714,992.

(51) Int. Cl.
*G06F 16/00* (2019.01)
*G06F 9/30* (2018.01)
(Continued)

(52) U.S. Cl.
CPC .......... *G06N 3/04* (2013.01); *G06F 9/30003* (2013.01); *G06F 9/4881* (2013.01); *G06F 16/9024* (2019.01)

(58) Field of Classification Search
CPC ..... G06N 3/04; G06F 9/30003; G06F 9/4881; G06F 16/9024
See application file for complete search history.

(56) References Cited

U.S. PATENT DOCUMENTS 6,026,241 A 2/2000 Chow et al.
6,381,739 B1 4/2002 Breternitz, Jr. et al.
(Continued)

FOREIGN PATENT DOCUMENTS

WO 2015/019364 A2 2/2015

OTHER PUBLICATIONS

U.S. Appl. No. 16/219,760, "Neural Network Processing Based on Subgraph Recognition", filed Dec. 13, 2018.
(Continued)

*Primary Examiner* — Alexander Khong
(74) *Attorney, Agent, or Firm* — Kilpatrick Townsend & Stockton LLP

(57) ABSTRACT

Systems and methods for providing executable instructions to a neural network processor are provided. In one example, a system comprises a database that stores a plurality of executable instructions and a plurality of subgraph identifiers, each subgraph identifier of the plurality of subgraph identifiers being associated with a subset of instructions of the plurality of executable instructions. The system further includes a compiler configured to: identify a computational subgraph from a computational graph of a neural network model; compute a subgraph identifier for the computational subgraph, based on whether the subgraph identifier is included in the plurality of subgraph identifiers, either: obtain, from the database, first instructions associated with the subgraph identifier; or generate second instructions representing the computational subgraph; and provide the first instructions or the second instructions for execution by a neural network processor to perform computation operations for the neural network model.

20 Claims, 14 Drawing Sheets

(51) Int. Cl.
   *G06F 9/48*     (2006.01)
   *G06F 16/901*   (2019.01)
   *G06N 3/04*     (2023.01)

(56) References Cited

U.S. PATENT DOCUMENTS

| | | | |
|---|---|---|---|
| 8,190,669 | B1 | 5/2012 | Oberman et al. |
| 8,826,255 | B1 | 9/2014 | Avadhanula et al. |
| 10,860,925 | B2* | 12/2020 | Tucker ................ G06N 3/08 |
| 11,714,992 | B1 | 8/2023 | Heaton et al. |
| 2006/0095722 | A1* | 5/2006 | Biles ................ G06F 8/4441 |
| | | | 712/34 |
| 2008/0049022 | A1* | 2/2008 | Sherb ................ G06Q 10/06 |
| | | | 345/440 |
| 2013/0185345 | A1 | 7/2013 | Tsadik et al. |
| 2015/0302075 | A1* | 10/2015 | Schechter ........... G06F 16/1734 |
| | | | 707/641 |
| 2017/0124452 | A1* | 5/2017 | Tucker ................ G06F 9/5066 |
| 2018/0246988 | A1* | 8/2018 | Johnson ............ G06F 16/9024 |
| 2019/0286973 | A1* | 9/2019 | Kovvuri ................ G06N 3/04 |
| 2019/0303153 | A1 | 10/2019 | Halpern et al. |
| 2020/0117465 | A1* | 4/2020 | Cassidy ................ G06N 3/04 |
| 2020/0117981 | A1* | 4/2020 | Arthur ................ G06N 3/063 |
| 2020/0160144 | A1* | 5/2020 | Gutfreund ............ G06N 3/082 |
| 2021/0374143 | A1* | 12/2021 | Neill ................ G06F 16/24568 |
| 2021/0390461 | A1* | 12/2021 | Harris ................ G06F 18/2323 |
| 2022/0383082 | A1 | 12/2022 | Zhang et al. |

OTHER PUBLICATIONS

Non-Final Office Action, U.S. Appl. No. 16/219,760, 16 pages, May 23, 2022.

Final Office Action, U.S. Appl. No. 16/219,760, 19 pages, Dec. 12, 2022.

Notice of Allowance, U.S. Appl. No. 16/219,760, 8 pages, Feb. 27, 2023.

U.S. Appl. No. 17/361,992, "Reconfigurable Neural Network Processing Based on Subgraph Recognition", filed Jun. 29, 2021.

Notice of Allowance, U.S. Appl. No. 17/361,992, 9 pages, Jun. 5, 2023.

* cited by examiner

NEURAL NETWORK PROCESSING BASED ON SUBGRAPH RECOGNITION

CROSS-REFERENCE TO RELATED APPLICATION

This application claims priority to and is a continuation of U.S. patent application Ser. No. 16/219,760, filed Dec. 13, 2018, and entitled "NEURAL NETWORK PROCESSING BASED ON SUBGRAPH RECOGNITION," the content of which is hereby incorporated by reference in its entirety for all purposes.

BACKGROUND

Artificial neural networks are computing systems with an architecture based on biological neural networks. Artificial neural networks can be trained, using training data, to learn about how to perform a certain computing task for an application.

A hardware accelerator, such as a neural network processor, can be programmed to implement an artificial neural network to perform the computing task. Compared with a general purpose computer, a hardware accelerator can have hardware resources optimized for neural network computations, and typically can perform neural network computations at a much higher speed than a general purpose computer. The performance of the hardware accelerator, however, depends on how the programming schedules the usage of the hardware resources at the hardware accelerator to perform the neural network computations, as the programming can introduce inefficiency to the hardware accelerator.

BRIEF DESCRIPTION OF THE DRAWINGS

Various embodiments in accordance with the present disclosure will be described with reference to the drawings, in which.

DETAILED DESCRIPTION

Figure 1:
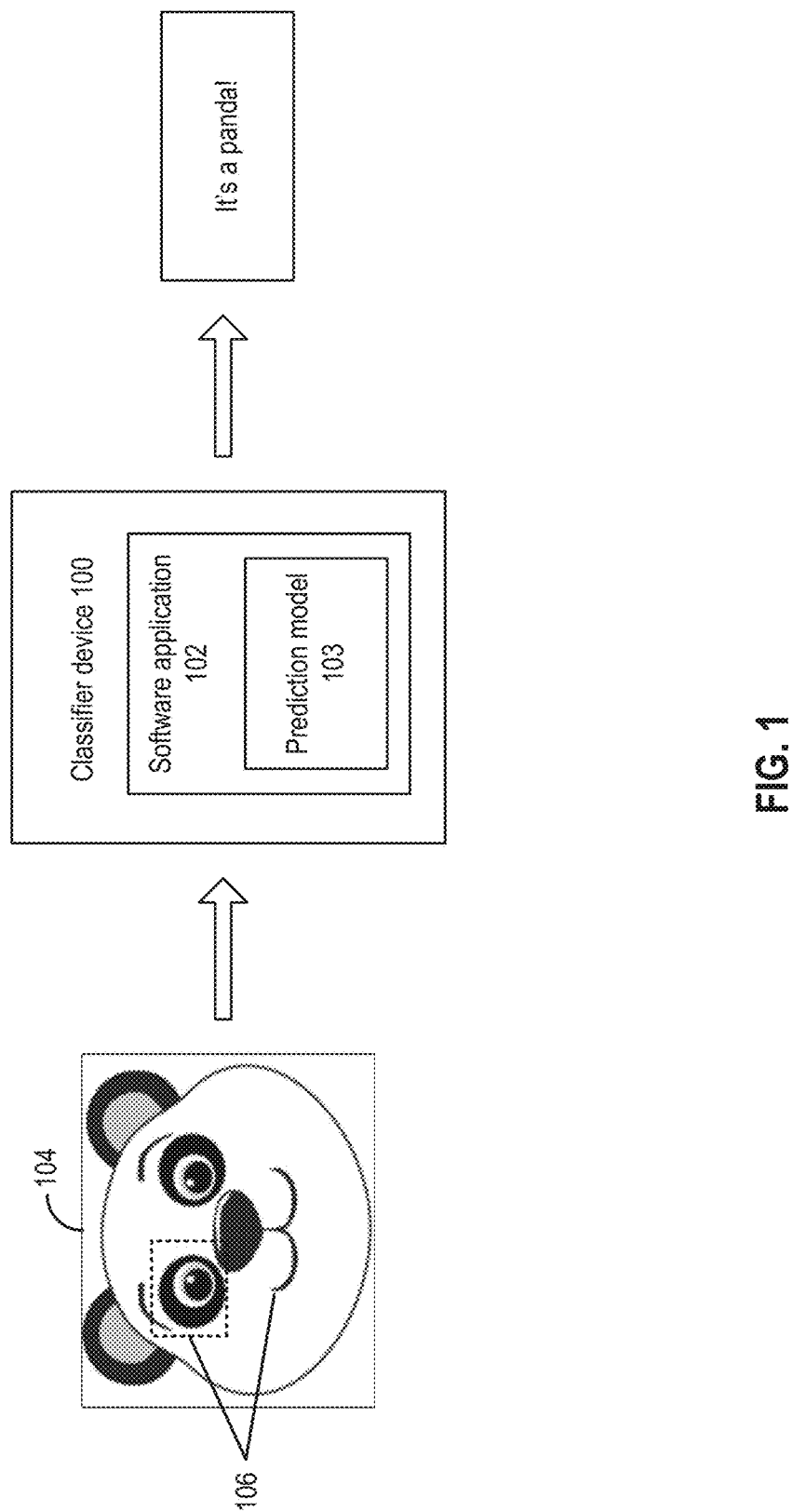
FIG. 1 illustrates an example a classifier device that uses techniques disclosed herein to process data.

Examples of the present disclosure relate to neural network processing, and more specifically, to a system that identifies a computational subgraph from a computational graph of a neural network, and that obtains pre-compiled executable instructions for the computational subgraph that are optimized for a neural network processor. The computational graph may represent a sequence of the computation operations to be performed for the neural network model, whereas the computation subgraph may represent a part of the sequence of the computation operations.

In some examples, the system comprises a database that stores a plurality of executable instructions and a plurality of subgraph identifiers, each subgraph identifier of the plurality of subgraph identifiers being associated with a subset of instructions of the plurality of executable instructions. The system further includes a compiler configured to: identify a computational subgraph from a computational graph of a neural network model, determine a subgraph identifier of the computational subgraph, and determine whether the subgraph identifier is included in the plurality of subgraph identifiers stored in the database. If the subgraph identifier is included in the plurality of subgraph identifiers stored in the database, the compiler can obtain, from the database, first instructions associated with the subgraph identifier. If the subgraph identifier is not included in the plurality of subgraph identifiers, the compiler can generate second instructions representing the computational subgraph. The compiler can provide one of the first instructions or the second instructions to a neural network processor for execution to perform computation operations for the neural network model. The first instructions and the second instructions are related to scheduling of resources of the neural network processor to support the part of the sequence of computation operations. The neural network processor may perform the part of the sequence of computation operations at a higher efficiency by executing the first instructions than by executing the second instructions.

An artificial neural network (herein after "neural network") may include multiple processing nodes. The processing nodes can be divided into layers including, for example, an input layer, a number of intermediate layers (also known as hidden layers), and an output layer. Each processing node of the input layer receives an element of an input set, and scales the element with a weight to indicate the element's degree of influence on the output. Each processing node in an intermediate layer can generate a sum of the scaled elements as an intermediate output, and then generate an output (of the intermediate layer) by applying an activation function to the intermediate output. The outputs of the intermediate layer may represent a lower-level decision that can contribute to the final output of the neural network (e.g., whether a feature is found), which can be processed by subsequent intermediate layers or a subsequent output layer to generate a final output/decision of the neural network. As such, the computation operations of a neural network typically occur in a sequential order starting from the input layer, followed by the intermediate layers, and concluding at the output layer.

A neural network processor can be programmed to implement a neural network to perform the computation operations. The programming may include instructions to, for example, map the hardware resources of the neural network processor to the neural network nodes, schedule operations of the hardware resources to support the computations, etc. The neural network processor can then execute the instructions to operate the hardware resources according to the mapping and the scheduling.

The instructions can be generated by a conventional compiler, which can decompose the computation operations into primitive instructions mapped to the hardware resources of the neural network processor. For example, the neural network processor may include a set of adders and multipliers. For an arithmetic operation that involves additions and multiplications, the compiler can decompose the arithmetic operation into primitive instructions to control the adders and the multipliers to perform, respectively, the additions and multiplications. The compiler can also arrange the primitive instructions in a sequence to reflect the scheduling of usage of the adders and multipliers in executing the primitive instructions. The mapping and scheduling of hardware resources by the conventional compiler are typically based on certain built-in assumptions. The assumptions may include, for example, a predicted workload of the neural network processor at different times, a predicted availability of the hardware resources at different times, the latency of the hardware resources in completing an operation before moving to the next one, etc.

These built-in assumptions, however, may prevent the compiler from generating the instructions to maximize the efficiency of operation of the neural network processor. Efficiency may be computed by measuring the achieved computation speed (e.g., tera-operations per second) of the neural network processor against the theoretical maximum computation speed of the neural network processor. Efficiency can be reduced when, for example, the built-in assumption does not reflect the actual operation condition of the neural network processor. As a result, the execution of the compiler-generated instructions can lead to, for example, under-utilization of the hardware resources, inefficient usage of the hardware resources, etc., all of which can prevent the hardware processor from operating to its full potential. This can lead to waste of hardware resources as well as degraded performance.

Examples of the present disclosure relate to neural network processing, and more specifically, to a system that identifies a computational subgraph from a computational graph of a neural network, and to obtain pre-compiled executable instructions for the computational subgraph that are optimized for a neural network processor. The computational graph may represent a sequence of the computation operations to be performed for the neural network model, whereas the computation subgraph may represent a part of the sequence of the computation operations.

In some examples, the system comprises a database that stores a plurality of executable instructions and a plurality of subgraph identifiers, each subgraph identifier of the plurality of subgraph identifiers being associated with a subset of instructions of the plurality of executable instructions. The system further includes a compiler configured to: identify a computational subgraph from a computational graph of a neural network model, determine a subgraph identifier of the computational subgraph, and determine whether the subgraph identifier is included in the plurality of subgraph identifiers stored in the database. If the subgraph identifier is included in the plurality of subgraph identifiers stored in the database, the compiler can obtain, from the database, first instructions associated with the subgraph identifier. If the subgraph identifier is not included in the plurality of subgraph identifiers, the compiler can generate second instructions representing the computational subgraph. The compiler can provide one of the first instructions or the second instructions to a neural network processor for execution to perform computation operations for the neural network model. The first instructions and the second instructions are related to scheduling of resources of the neural network processor to support the part of the sequence of computation operations. The neural network processor may perform the part of the sequence of computation operations at a higher efficiency by executing the first instructions than by executing the second instructions.

Compared with a current neural network processor which relies on a compiler to generate the primitive instructions for execution, examples of the present disclosure allow for obtaining pre-compiled instructions from a database that can lead to an improved operation efficiency at the neural network processor, if such pre-compiled instructions are available. Those pre-compiled instructions can be generated by an alternative generator such as, for example, a machine learning process, human experts, etc., all of which may ignore some or all of the built-in assumptions of a conventional compiler to explore different solution spaces to maximize the operation efficiency of the neural network processor. For example, the alternative generator may ignore the predicted load of the neural network processor and can generate instructions to maximize the usage of the hardware resources to perform the computation operations. Such instructions can be stored in the database and can be provided to the neural network processor to improve its performance. If such instructions are not available, the system can revert back to the conventional compiler approach and generate the primitive instructions based on built-in assumptions, and provide the primitive instructions to the neural network processor. With such arrangements, it can be ensured that the neural network processor can receive and execute instructions to complete the computations of the neural network, and the performance of the neural network processor can be improved by providing pre-compiled optimized instructions if such instructions are available.

Examples of the present disclosure can also improve the efficiency in providing executable instructions to a neural network processor by leveraging existing pre-compiled instructions, which can save the time and resources by the compiler. As described above, the system can identify a computational subgraph from a computational graph, and provide pre-compiled instructions representing the computational subgraph to the neural network processor, rather than regenerating the instructions, which not only takes time but also precious computation resources. In a case where the computation graph includes numerous instances of the computational subgraph, the system can provide the pre-compiled instructions for each instance of the computational subgraph, rather than regenerating the instructions for each instance. Such arrangements can lead to substantial saving in the time and resources used in providing the executable instructions to the neural network processor.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates an example classifier device 100 that uses techniques disclosed herein to process data. Classifier device 100 can be, for example, a computing device operating a software application 102 and a prediction model 103 to predict information included in a data sequence, and perform a predetermined function based on the prediction. For example, classifier device 100 can be part of an image recognition service provided to identify certain objects (e.g., text, a person, etc.) from an image. It is understood that the image recognition service is merely provided as an illustrative example, and that techniques disclosed herein can be used for other data processing applications including, for example, text-based data processing (e.g., processing of search queries), audio data processing, etc. Moreover, classifier device 100 may operate a number of different prediction models to process different input data, either in parallel or at different times.

In some examples, the image recognition service can be provided in a multi-tenant compute service system. The multi-tenant compute service system may typically include a plurality of servers that can host data and be used by multiple clients or organizations to run instances, such as virtual machine instances or bare-metal instances (e.g., operating systems that run directly on the server hardware). In most instances, such as bare-metal or virtual machine instances, a multi-tenant compute service system may be allocated to a client when the client needs them and decommissioned when they are no longer needed, such that the resources can be reallocated to other clients. In the present disclosure, the terms "tenant," "client," and "customer" may be used interchangeably, although such terms do not necessarily imply the existence of any particular business arrangement. The term "instance" may refer to, for example, an instance that is executed directly on server hardware or as a virtual machine. Different types of instances generally correspond to different hardware functions and/or arrangements of hardware (e.g., different amounts of available memory and/or processing hardware). In the example of FIG. 1, the multi-tenant compute service system may provide the image recognition service when the client needs it, and the service is decommissioned when it is no longer needed, such that the resources supporting the image recognition service (e.g., access to software application 102, and the underlying hardware resources for processing software application 102) can be reallocated to other clients. Different clients (or one client) may request application 102 to perform processing of different input data using the same or different prediction models including prediction model 103.

In the example of FIG. 1, software application 102 can receive pixel data of an image 104 from a user. Image 104 may include an array of pixels. Software application 102 can perform analysis on the pixel data, and predict one or more objects 106 depicted in image 104. The analysis may include, for example, comparing the pixel data against a set of predetermined features data. The predetermined features data may include data associated with a set of predetermined visual image features such as, for example, a nose object, a mouth object, etc. The predetermined features data may also include data associated with non-visual image features, or a combination of visual and non-visual image features. As to be discussed in more detail below, software application 102 may employ prediction model 103 to compute a set of scores based on the pixel data of image 104. The set of scores may represent, for example, the likelihood of image 104 including the image features represented by the features data. Software application 102 can then determine other information about the content of image 104 based on the scores. For example, based on the scores, software application 102 can determine that image 104 is an image of, for example, a panda, a cat, or other objects. The present disclosure provides examples of techniques to allow trade-off between speed and precision of operating prediction model 103, as to be discussed below.

Figure 2A:
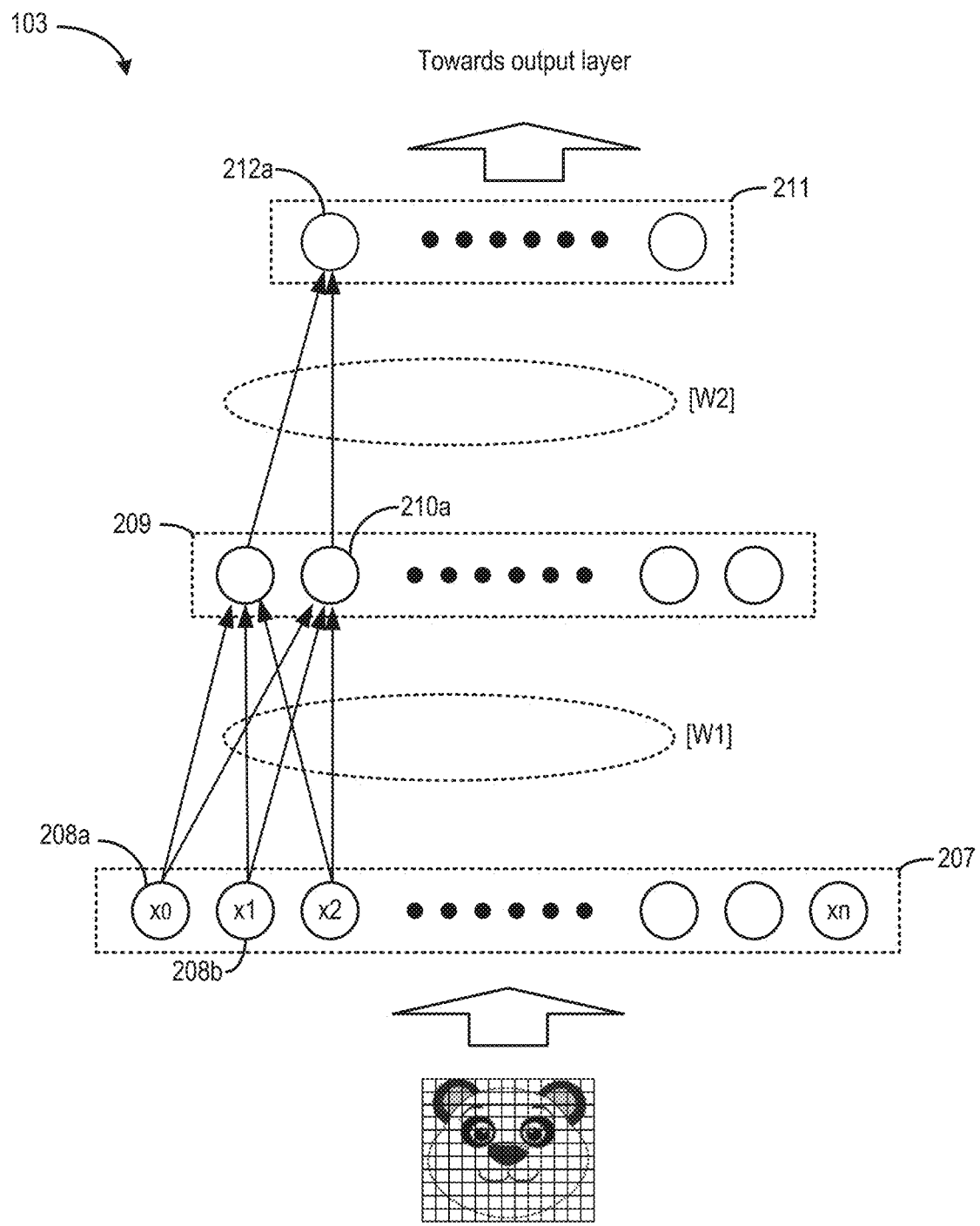
FIGS. 2A and 2B are simplified block diagrams illustrating a prediction model and the computations that use techniques disclosed herein, according to certain aspects of the present disclosure.

Prediction model 103 can be in the form of an artificial neural network. The artificial neural network may include a plurality of processing nodes, with each processing node configured to process part of the input pixel data, or to further process the intermediate outputs from other processing nodes. FIG. 1 illustrates an example of prediction model 103 that uses techniques disclosed herein. In FIG. 1, prediction model 103 may be a multi-layer neural network such as a deep neural network (DNN), a convolutional neural network (CNN), etc. Prediction model 103 may include an input layer 207, a set of intermediate layers including intermediate layers 209 and 211, and an output layer (not shown in FIG. 2A). It is understood that prediction model 103 can also include other different types of neural networks including, for example, long short-term memory (LSTM), multilayer perception (MTP), multiscale densenet (MSD-NET), etc.

Layer 207 may process pixel data representing different portions of image 104. For example, in the example of FIG. 2A, layer 207 may process the pixel data of image 204. Each processing node of layer 207 is assigned to receive a pixel value (e.g., $x_0$, $x_1$, $x_2$, ... $x_n$) corresponding to a predetermined pixel within image 104, and transmit one or more weights with the received pixel value to layer 209. In a case where prediction model 203 is a DNN, each processing node of layer 207 can be assigned a set of weights defined based on a matrix W1. Each processing node of layer 207 can send the received pixel value and the assigned weights to each processing node of layer 209. In a case where prediction model 103 is a CNN, groups of the processing nodes of layer 207 may share a set of weights, and each group may send the set of weights and the pixel values received by the group of processing nodes to a single processing node of layer 209. Different neural network models may include different topologies (e.g., including a different number of layers, different connections between layers, etc.), and/or include a different set of weights for each layer.

Layer 209 may process the scaled outputs from layer 207 to generate a set of intermediate outputs. For example, assuming processing node 210a of layer 209 is connected to n processing nodes in layer 207, processing node 210a may generate a sum of the scaled outputs received from layer 207 based on the following equation:

$$\text{sum}_{210a} = \sum_{i=0}^{n}(W1_i \times x_i) \quad \text{(Equation 1)}$$

Here, $\text{sum}_{210a}$ represents an intermediate output generated by processing node 210a. $W1_i \times x_i$ represents a scaling of a particular pixel value (e.g., $x_0$) with the associated weight (e.g., $W1_0$) by a processing node of layer 207. In a case where prediction model 103 is a DNN, each processing node of layer 209 may generate the sum based on the scaling of pixel values from each processing node of layer 207, and then generate a sum (e.g., $\text{Sum}_{210a}$) by summing the scaled pixel values. The sum may also represent a dot-product between an input vector comprising a number of elements (e.g., pixel values) and a weight vector (e.g., W1). In some examples, a bias can also be added the scaled outputs to generate the intermediate output.

Figure 2B:
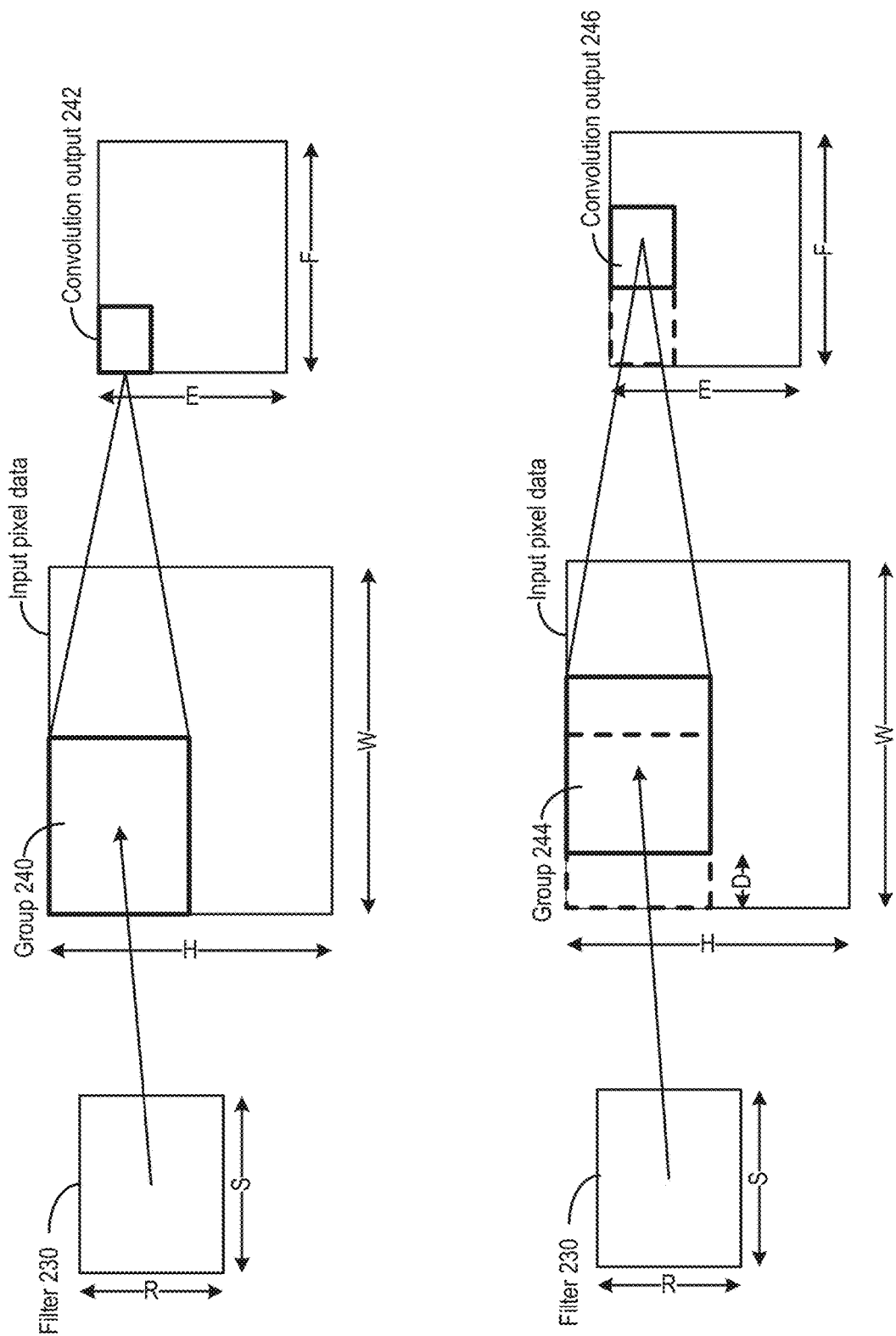

In a case where prediction model 103 is a CNN, each processing node of layer 209 may generate the intermediate output based on the scaling of pixel values from a group of processing nodes of layers 207. The intermediate output may represent a convolution result between a group of pixel values and a filter comprising the weight values. FIG. 2B illustrates an example of a convolution operation that layer 209 may perform. In FIG. 2B, filter 230 may include a two-dimensional array of weights. The weights in filter 230 may represent a spatial distribution of pixels for certain features to be detected from the image. The two-dimensional array may have a height of R rows and a width of S columns, and is typically smaller than an input image with a height of H pixels and a width of W pixels. Each weight may be mapped to a pixel in a rectangular block of pixel values with the same R rows and S columns. A processing node of layer 209 (e.g., processing node 210a) can receive, from a group of processing nodes of input layer 207, a group 240 of pixel values corresponding to a first rectangular block of pixels from the input image, and generate a convolution output 242 based on a summation of multiplication results between each weight of filter 230 and each corresponding pixel in group 240 according to Equation 1, to generate a dot-product between a matrix represented by filter 230 and a matrix represented by group 240. Another processing node of layer 209 can also receive, from another group of processing nodes of input layer 207, a group 244 of pixel values corresponding to a second rectangular block of pixels from the input image, and generate a convolution output 246 based on a summation of multiplication results between each weight of filter 230 and each corresponding pixel in group 244 according to Equation 1, to generate a dot-product between the matrix of filter 230 and a matrix represented by group 240. In some examples, each convolution output in FIG. 2B (e.g., convolution output 242, convolution output 346, etc.) can correspond to the output of a processing node of layer 209. In some examples, the pixel data in the input image may be referred to as an input feature map to indicate that the pixels are processed by the same filter (or same sets of filters) corresponding to certain feature(s). The convolution outputs may be referred to as an output feature map to indicate that the output is the result of processing an input feature map with the filter.

As shown in FIG. 2B, the convolution operations can be arranged in a sliding-window such that the second rectangular block overlaps, or is otherwise adjacent to, the first rectangular block in the input image. For example, in the example of FIG. 2B, D may be a distance of stride (in pixel) of the sliding-window for each convolution operation, such that the block of pixels corresponding to group 244 may be situated at a distance D (in terms of pixels) from the block of pixels corresponding to group 240, and the next block of pixels may also be situated at the same distance D from group 244. Other processing nodes of layer 209 may also receive groups of pixels corresponding to other rectangular blocks and generate other intermediate outputs. The convolution outputs can be part of a convolution output array. The array of convolution outputs can have a smaller height and a smaller width than the input image. Rectangular blocks of the convolution outputs can be further grouped, and convolution operations can be performed at layer 211 between the groups of convolution outputs and another set of filter weights to generate another set of convolution outputs.

Referring back to FIG. 2A, one processing node of layer 209 may be configured to generate the convolution output elements of one convolution output array, and a set M of processing nodes of layer 209 can correspond to a set M of convolution output arrays. The processing node of layer 209 can also process each convolution output with an activation function to generate an activation output. The activation function may translate the convolution output into a decision of whether to forward the convolution output to intermediate layer 211 to influence the classifier decision (analogous to the firing of a biological neuron). An example of the activation function can be a rectified linear unit (ReLU) defined according to the following equation:

$$ReLU(x) = \begin{cases} x & \text{for } x \geq 0 \\ 0 & \text{for } x < 0 \end{cases} \quad \text{(Equation 2)}$$

In addition to ReLU, other forms of activation function can also be used including, for example, a softplus function (which can be a smooth approximation of a ReLU function), a hyperbolic tangent function (tanh), an arc tangent function (arctan), a sigmoid function, a Gaussian function, etc.

A processing node of layer 209 (e.g., processing node 210a) may process the sum with the ReLU function to generate a first output of layer 209 based on the following equation:

$$\text{first\_output}_{210a} = ReLU(\text{Sum}_{210a}) \quad \text{(Equation 3)}$$

Layer 211 may further process the scaled intermediate outputs from layer 209 by, for example performing additional convolution operations based on different sets of filters. The outputs from each processing node of layer 211 may be forwarded to other higher intermediate layers, or to an output layer (not shown in FIG. 2A). The output layer may form an output vector representing, for example, a probability that certain features are included in image 104, and/or a probability that image 204 includes an image of a panda. For example, the output vector may be compared against a reference vector associated with a nose object of a panda, or a reference vector associated with a panda. A decision about whether image 104 is an image of a panda can be determined based on the comparison result.

Figure 3A:
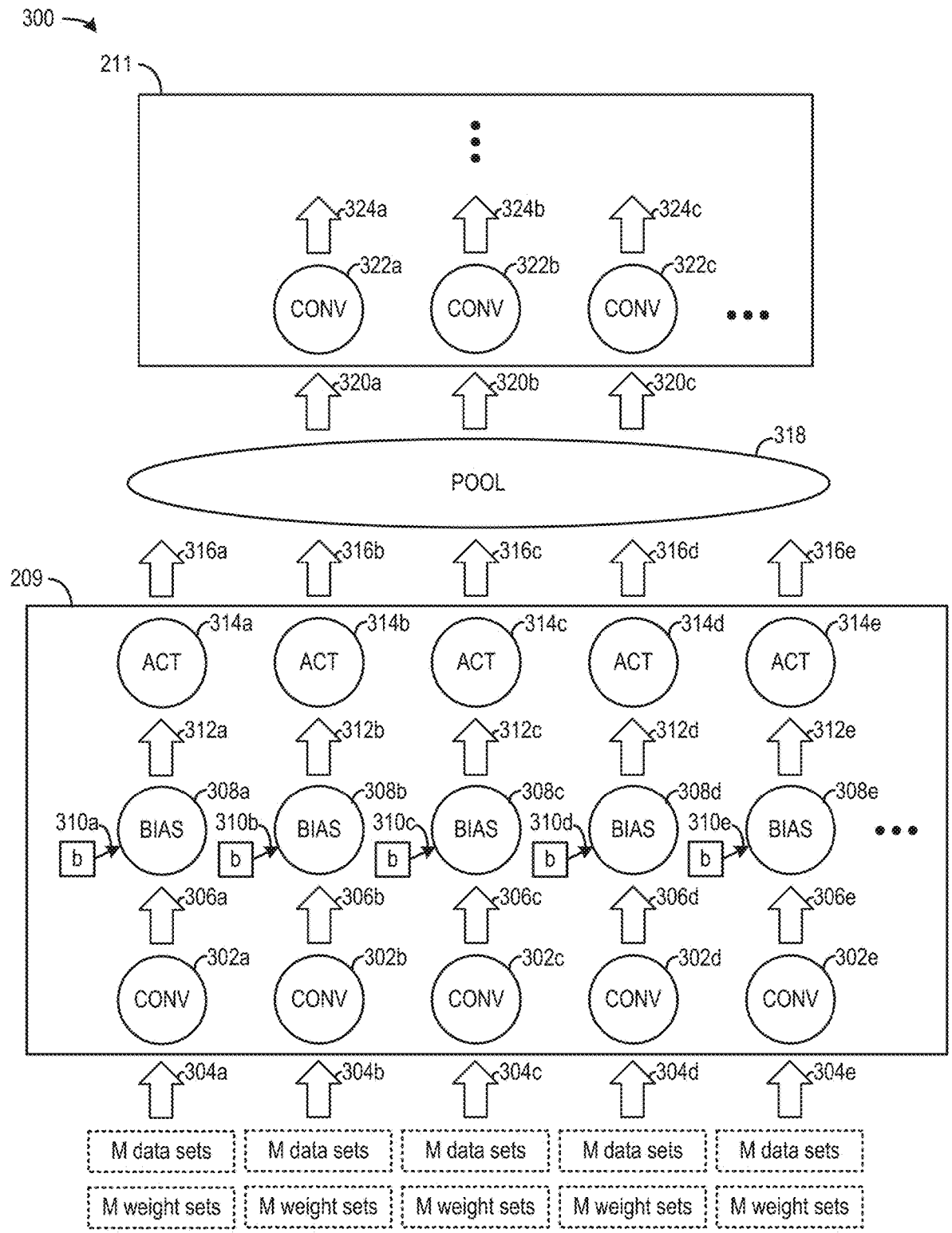
FIGS. 3A-3C illustrate examples of computational graphs and subgraphs representing sequences of computations performed using the prediction model of FIGS. 2A and 2B, according to certain aspects of the present disclosure.

As described above, a neural network performs a sequence of computation operations to generate a decision. The sequence of computation operations can be represented by a computational graph. FIG. 3A illustrates an example of a computational graph 300 representing the sequence of computation operations performed by prediction model 103. As shown in FIG. 3A, computation graph 300 include a set of nodes and a set of edges. Each node (represented by a circle or an ellipse in FIG. 3A) can represent a computation operation within a neural network node or between neural network layers, whereas the edges (represented by the arrows in FIG. 3A) represent flow of data between the computation operations represented by the nodes, as well as the dependency between the nodes.

For example, computational graph 300 includes nodes 302 (e.g., nodes 302a-302e, labelled "CONV" in FIG. 3A) which can represent a convolution operation. Each of nodes 302 is connected to one of edges 304 (e.g., node 302a connected to input edge 304a) to receive M data sets and M weight sets, and to perform a convolution operation on the M data sets and M weight sets. Each of nodes 302 is also connected to one of edges 306 (e.g., nodes 302a connected to output edge 306a) which represents transfer of convolution output out of the node after the convolution operation completes. Computational graph 300 further includes nodes 308 (e.g., nodes 308a-308e, labelled "BIAS" in FIG. 3A) representing bias addition operation to the convolution output of nodes 302a. Each of nodes 308 is connected to one of edges 306 and one of edges 310 (e.g., edges 310a-310e) to receive, respectively, a convolution output and a bias value (labelled "b" in FIG. 3A) to perform the bias addition operation. Each of nodes 308 is also connected to one of edges 312 (e.g., edges 312a-312e) to output the bias addition results after the bias addition operation completes. Computational graph 300 further includes nodes 314 (e.g., nodes 314a-314e, labelled "ACT" in FIG. 3A) representing activation function process (e.g., ReLU) of the bias addition results. Each of nodes 314 is connected to one of edges 312 to receive the bias addition outputs from one of nodes 308 and to one of edges 316 (e.g., edges 316a-316e) to output the activation function outputs. Nodes 302, 308, and 314 may represent the computation operations at intermediate layer 209 of FIG. 2A. A set of one of nodes 302, 308, and 314 (e.g., node 302a, 308a, and 314a) may represent a sequence of computation operations at a neural network node (e.g., node 210a) of intermediate layer 209.

Computational graph 300 further includes a node 318 representing a pooling operation (e.g., max pooling, average pooling, etc., labelled "POOL" in FIG. 3A) on the outputs of intermediate layer 209. Node 318 may include a set of sub-nodes (not shown in FIG. 3A) to perform hierarchical pooling operations. Node 318 is connected to edges 316a-316e to receive the activation function outputs from nodes 314, and edges 320 to output the pooling results. Computational graph 300 further includes nodes 322 representing convolution operations of a subsequent neural network layer (e.g., layer 211) which are connected to edges 320 to receive the pooling results, and to edges 324 to provide the convolution results as inputs to other computation operations of intermediate layer 211. The outputs of intermediate layer 211 can also be processed by another pooling operation (not shown in FIG. 3A).

As described above, a neural network processor can be programmed by a set of instructions to perform a sequence of computation operations by a neural network, represented by computational graph 300. The instructions can map different hardware resources (e.g., arithmetic circuits, mapping tables, etc.) to support the computation operations represented by the nodes in computational graph 300, and to support movement of data between the computation operations. Moreover, the edges between the nodes can also provide indications of the data dependency between the computation operations, and the programming can schedule the usage of the mapped hardware resources based on the data dependency. As an illustrative example, the instructions can control the computation operations represented by nodes 302, 308, and 314 to take place sequentially at a first set of mapped hardware resources, followed by the pooling operation represented by node 318 at a second set of mapped hardware resources, and then followed by the computation operations represented by nodes 322 at a third set of mapped hardware resources.

In some examples, the instructions can be generated by a compiler based on computational graph 300. The compiler can traverse computational graph 300 to visit each node and translate the computation operations in each node to instructions executable by a neural network processor. For example, the compiler can decompose a convolution operation (e.g., of nodes 302a, 302b, etc.) into a set of primitive multiplication and addition instructions, which can control the arithmetic hardware resources (e.g., adders, multipliers, etc.) of the neural network processor to perform multiplication and addition operations for the convolution operation. The compiler can also generate instructions targeted at other hardware resources of the neural network processor to perform activation function processing and pooling operations. The compiler can also arrange the instructions based on the data dependency reflected by the direction of the edges, as well as certain built-in assumptions. For example, the compiler may arrange the instructions to perform the convolution operations first, followed by bias additions, activation function processing, and pooling. Moreover, based on certain assumptions of the neural network processor, the compiler may also arrange some of the instructions to enable them to be executed in parallel. For example, based on an assumed workload of the neural network processor, the compiler may allow four convolution operations to be performed concurrently. The compiler may arrange, for example, the instructions generated from the nodes 302a, 302b, 302c, and 302d are to be executed in parallel in the neural network processor.

While a compiler can convert a computational graph of a neural network into a sequence of instructions executable by a neural network processor, the arrangement of the instruction, based on built-in assumptions of the compiler, may prevent the neural network processor from achieving high execution efficiency. For example, the compiler may overestimate the load of the neural network processor and may allow a fewer number of parallel computation operations than the neural network processor would otherwise support. The under-utilization and/or inefficient usage of the hardware resources, due to incorrect built-in assumptions of the compiler, can prevent the hardware processor from operating to its full potential. This can lead to waste of hardware resources as well as degraded performance.

One way to improve the execution efficiency is by employing an alternative source to generate the executable instructions. One potential alternative source is a human expert. The human expert can manually schedule the operations at a neural network processor to achieve higher execution efficiency, which can then be converted into instructions. The human expert can break the assumptions built into the compiler and explore different solution spaces to arrive at the scheduling decisions. Another potential alternative source is by machine learning. For example, through machine learning, the compiler (or other machine learning process) can be trained to convert a computational graph into different sequences of instructions that are optimized for different operation conditions (e.g., system load, system delay, etc.) at a neural network processor. The training can be performed based on a target of, for example, maximizing the execution efficient of the neural network processor. The trained compiler can then generate a sequence of instructions for the computational graph and for a given operation condition at the neural network processor to maximize the execution efficiency.

While a human expert and a machine learning process may generate executable instructions for a computational graph to maximize (or at least improve) the execution efficiency of a neural network processor, the size of the computational graph handled by the human expert and machine learning process is typically small. It is unlikely that a human expert can schedule the computation operations for a computational graph comprising thousands or millions of nodes. It is also extremely costly, in terms of resource and time, to train a machine learning process to generate instructions for a computational graph comprising thousands or millions of nodes.

To facilitate the conversion of computational graph 300 using pre-existing and optimized executable instructions, computational graph 300 may be split into a plurality of computation subgraphs including identical computation subgraphs. Each computational subgraph includes a subset of nodes and edges of computational graph 300, and can represent a part of the sequence of computation operations of computational graph 300. A human expert and/or a machine learning process may generate executable instructions for a computational subgraph, which can include far fewer nodes and edges, and thus require far lower cost to convert to optimized instructions, than the entire computational graph 300. As a result, it becomes much more likely that optimized instructions for a computational subgraph can be found and used to convert computational graph 300 into instructions.

Figure 3B:
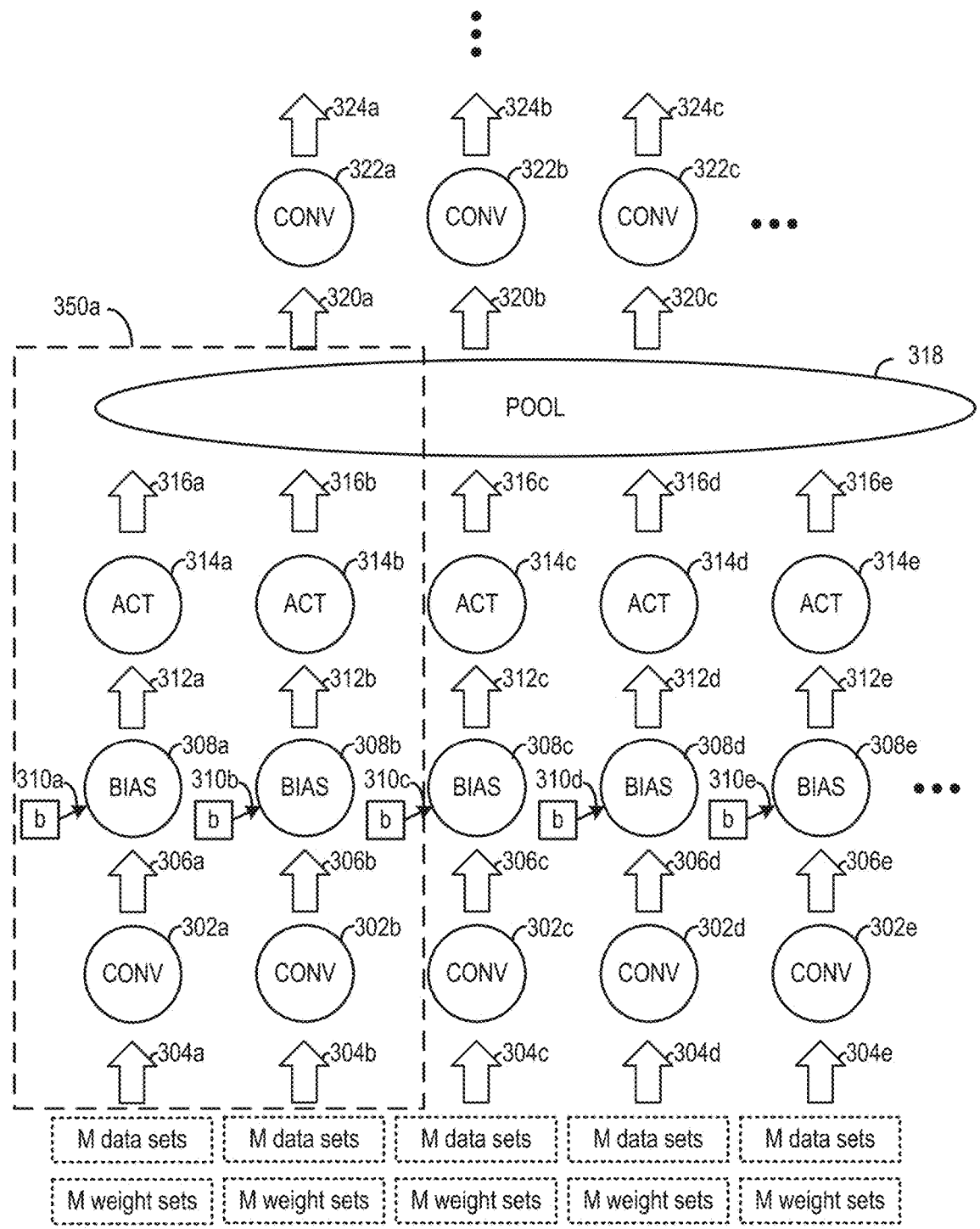
Figure 3C:
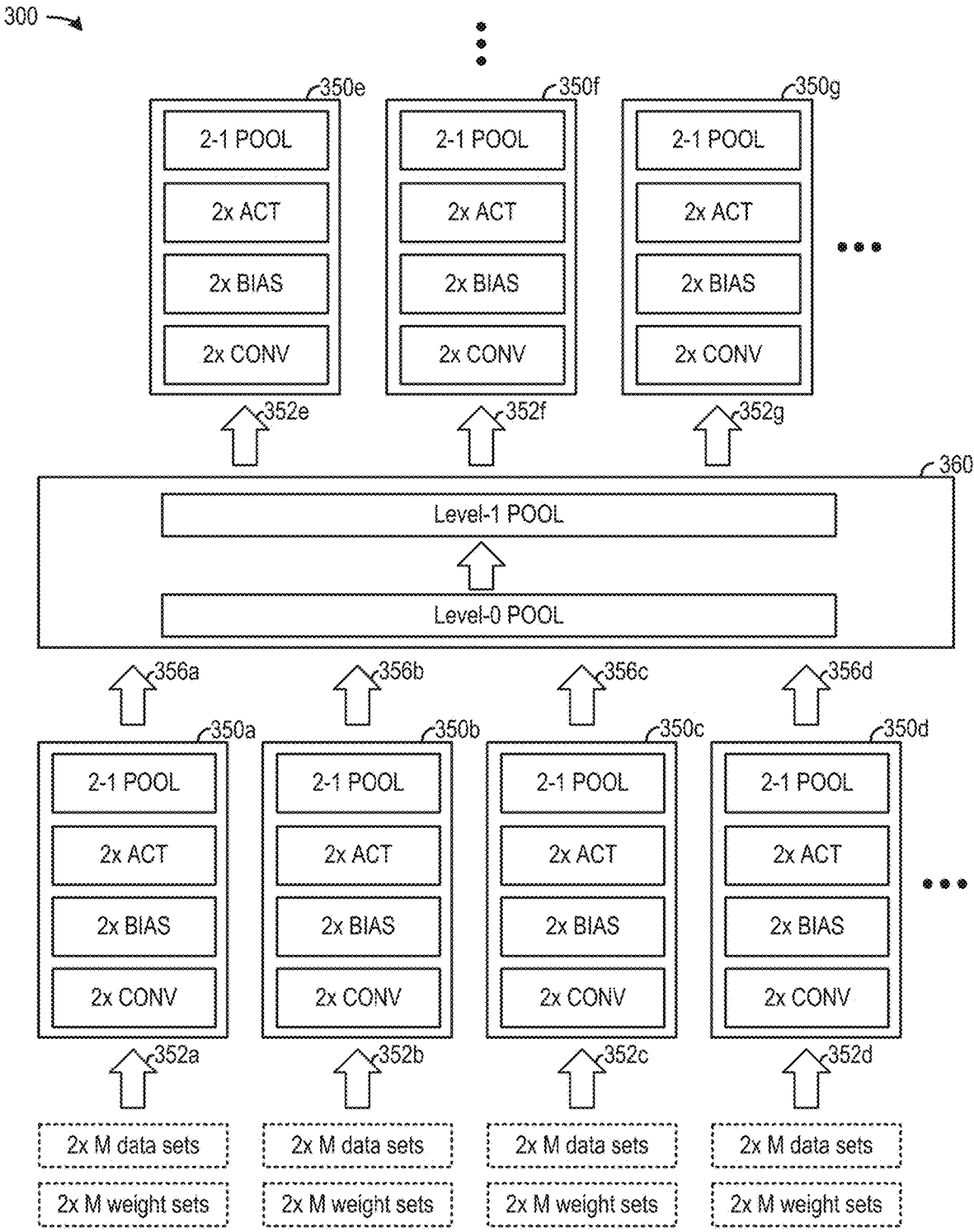

FIG. 3B and FIG. 3C illustrate examples of computational subgraphs of computational graph 300. As shown in FIG. 3B, computational graph 300 may include a computational subgraph 350 which includes nodes 302a-302b, 308a-308b, 314a-314b, some sub-nodes of node 318, and the edges connected the nodes. As shown in FIG. 3C, computational graph 300 may include multiple instances of computational subgraphs 350 representing sequences of computations at different neural network layers. For example, computational subgraphs 350a-350d represent the part of sequence of computation operations at intermediate layer 209, whereas computational subgraphs 350e-350g represent the part of sequence of computation operations at intermediate layer 211. Each of computational subgraphs 350 may receive different input data and generate different output data depending on which nodes and edges are represented in the subgraph and which neural network layer the subgraph is part of. But each of computational subgraphs 350 has the same sequence of computation operations. For example, each computational subgraph 350 may include two convolution operations, followed by two bias addition operations, followed by two activation function processing operations, and followed by a 2-to-1 pooling operation. Moreover, each of computational subgraphs 350 is connected to one of edges 352 for receiving input data and one of edges 356 for transferring the output data. For example, computational subgraph 350a is connected to edge 352a and edge 356a. Each of edges 352 can transfer the same number of input data elements (e.g., 2×M data sets and 2×M weight sets) to one of computational subgraphs 350, and edges 352 have the same dimension (e.g., 4×M). Moreover, each of edges 356 can transfer the same number of output data elements (e.g., one convolution output data element from 2-1 pooling) from one of computational subgraphs 350, and edges 356 have the same dimension (e.g., one). Computational graph 300 also includes other computational subgraphs, such as computational subgraph 360 which includes part of the pooling operations of node 318 to perform pooling on the outputs from the computational subgraphs of intermediate layer 209.

To convert computational graph 300, a compiler (or other instruction generation system) can search for pre-determined computational subgraphs, such as computational subgraphs 350, that have pre-existing instructions available from an alternative source. For each instance of computational subgraphs 350 (e.g., computational subgraphs 350a, 350b, etc.), the compiler can obtain the pre-existing instructions, and include the pre-existing instructions as part of the executable instructions of computational graph 300. For a computational subgraph of which pre-existing instructions cannot be found, the compiler can traverse the computational subgraph and decompose the computation operations into primitive instructions targeted at various hardware components of the neural network processor, as a conventional compiler does.

Figure 4:
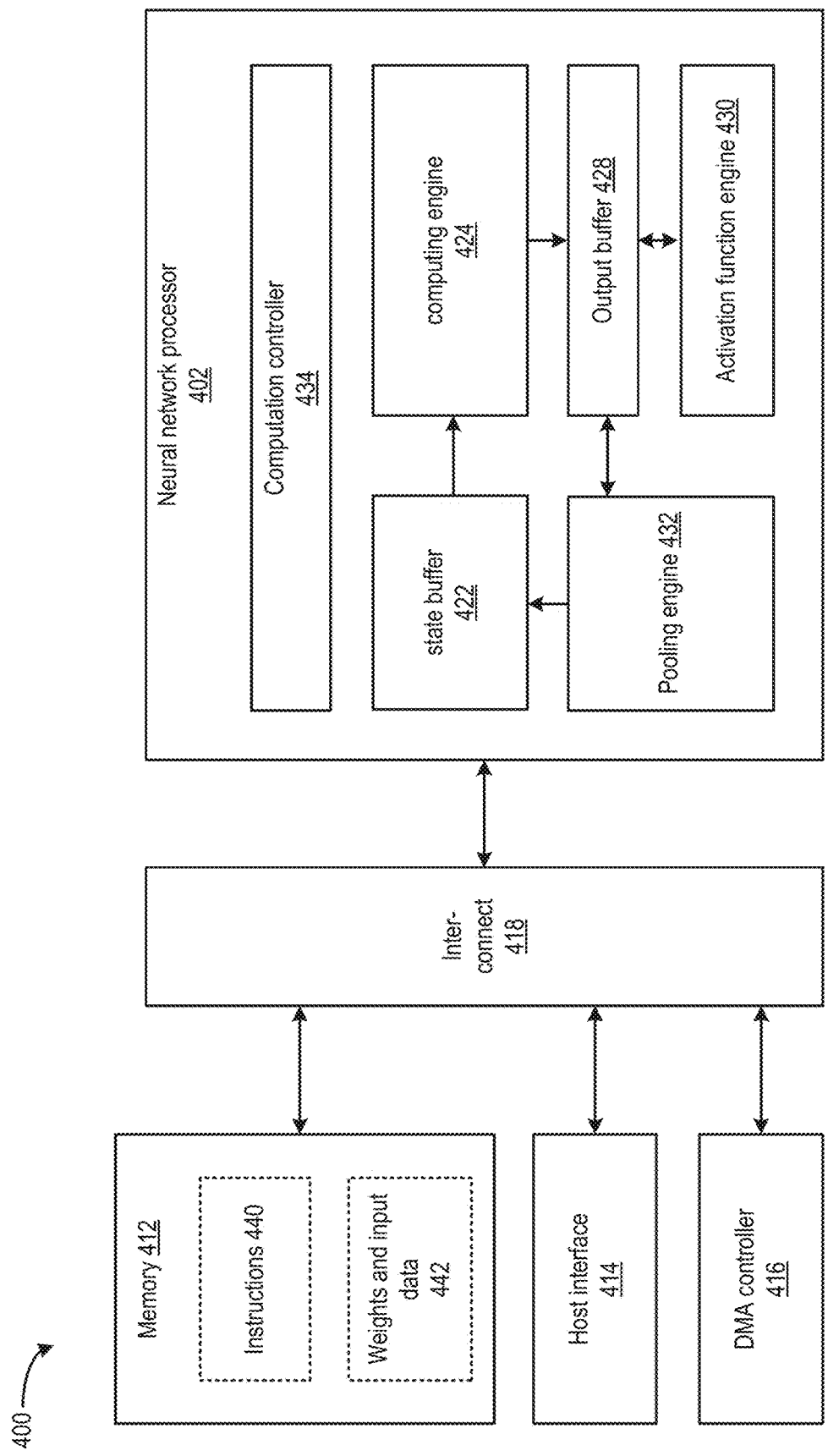
FIG. 4 illustrates an example neural network processor that can execute the instructions generated using the techniques of the present disclosure.

FIG. 4 shows an apparatus 400 that can execute the instructions generated using the techniques of the present disclosure. Apparatus 400 may be part of a computer system, e.g., a host server. Apparatus 400 may be part of a multi-tenant compute service system and can communicate with a host device (not shown in FIG. 4) to provide computing and memory resources for a computing service. For example, referring back to FIG. 1, apparatus 400 may be a hardware accelerator provide computing and memory resources for computations with prediction model 103. A host device can operate software application 102 and communicate with apparatus 400 to perform one or more image recognition tasks based on computations with prediction model 103. The host device may transmit multiple image data sets associated with multiple contexts, and provide the multiple image data sets to apparatus 400, which can generate multiple outputs to predict, for example, whether each of the multiple image data sets includes a predetermined object. It is understood that the architecture and components of apparatus 400 are provided only for illustration, and that instructions generated using the disclosed techniques can be executed at other systems having different architecture and/or hardware components.

In the example of FIG. 4, apparatus 400 may include a neural network processor 402 coupled to memory 412, a direct memory access (DMA) controller 416, and a host interface 414 via an interconnect 418. As to be discussed in more detail, neural network processor 402 can provide the computing resources to support the computations with prediction model 103. Neural network processor 402 can include an integrated circuit such as, for example, a System-on-Chip (SoC). Memory 412 may be configured to store the instructions, input data (e.g., pixel groups 249 and 244 of FIG. 2B) and the weights (e.g., filter 230) received from the host device. Memory 412 may also be configured to store the output of neural network processor 402 (e.g., convolution outputs 242 and 246 of FIG. 2B). Memory 412 may include any suitable memory, e.g., dynamic random access memory (DRAM), synchronous DRAM (SDRAM), double data rate DRAM (DDR DRAM), storage class memory (SCM), flash memory devices, etc.

DMA controller 416 may be configured to perform DMA operations to transfer data between neural network processor 402 and the host device. For example, as discussed above, the host device can store the instructions, input data, and the weights at memory 412. The host device can provide the memory addresses for the stored instructions, data, and weights to neural network processor 402 (e.g., in the form of memory descriptors). Neural network processor 402 can then obtain the stored instructions, data, and weights based on the memory addresses provided by the host device. Neural network processor 402 can also store the results of computations (e.g., one or more image recognition decisions) at memory 412, and provide the memory addresses for the stored results to the host device.

Host interface 414 may be configured to enable communication between the host device and neural network processor 402. For example, host interface 414 may be configured to transmit the memory descriptors including the memory addresses of the stored data (e.g., input data, weights, results of computations, etc.) between the host device and neural network processor 402. Host interface 414 may include, for example, a peripheral component interconnect express (PCIe) interface or any suitable interface for communicating with the host device.

Neural network processor 402 can provide the computing resources to support the computations with one or more instances of prediction model 103. As shown in FIG. 3A, neural network processor 402 may include a state buffer 422, a computing engine 424, an output buffer 428, an activation function engine 430, and a computation controller 434.

State buffer 422 can provide caching of data used for computations at computing engine 424. The data cached at state buffer 422 may include, for example, the input data, weights, and biases acquired from memory 412, as well as intermediate outputs of computations at computing engine 424. The caching can reduce the effect of memory access bottleneck (e.g., caused by the latencies at memory 412, DMA controller 416, interconnect 418, etc.) on the performance of computing engine 424. State buffer 422 can be an on-chip memory device and may include, for example, static random access memory (SRAM).

State buffer 422 can be controlled by computation controller 434 to fetch weights, bias, and input data to a neural network layer to computing engine 424. Computing engine 424 can perform neural network computations for that neural network layer based on the weights, bias, and input data to generate weighted sums. Computing engine 424 may include a set of circuitries configured to perform one or more arithmetic operations involved in neural network computations. For example, computing engine 424 may include a set of multipliers to perform the scaling of input data with associated weights, and a set of adders to generate a sum of the results of multiplications representing dot-products and convolution results, as discussed above. The weighted sums can be collected and accumulated at output buffer 428 to generate intermediate output data. Output buffer 428 can provide the intermediate output data to activation function engine 430 to perform activation function processing to generate the outputs of a neural network layer. The outputs can be stored in state buffer 422, which can fetch the outputs, as well as a new set of weights and bias, to computing engine 424 to perform neural network computations for the next neural network layer.

Referring back to FIG. 3A, a compiler can generate executable instructions to control the hardware components of neural network processor 402, including state buffer 422, computing engine 424, output buffer 428, activation function engine 430, and pooling engine 432, to perform the computation operations of computational graph 300. As an illustrative example, the instructions 440 and weights and input data 442 can be stored in memory 412. Instructions 440 can be fetched from memory 412 to computation controller 434. Computational controller 434 can control the hardware components to perform the computations for nodes 302 (convolution), nodes 308 (bias addition), and nodes 314 (activation function) corresponding to neural network layer 209, followed by pooling operation (of node 318) and the computations for neural network layer 211, based on instructions 440. The instructions can specify, for example, a number of convolution operations to be performed at computing engine 424 at a given time, and control state buffer 422 to fetch part of weights and input data 442 for the number of convolution operations to computing engine 424. The instructions can also control computing engine 424 to perform the arithmetic operations for the convolution operations (of nodes 302) and bias addition operations (of nodes 308), and store the outputs at output buffer 428. The instructions can also control output buffer 428 to forward the outputs to activation function engine 430 to perform activation function processing (of nodes 314), and to forward the activation function processed outputs to pooling engine 432 to perform pooling operation (of nodes 318). The instructions can also control pooling engine 432 to store the pooling operation outputs at state buffer 422 as inputs to the next neural network layer (neural network layer 211).

FIG. 5A to FIG. 5E illustrate examples of a system 500 to provide executable instructions to apparatus 400, according to examples of the present disclosure. In some examples, system 500 may be part of a host machine, whereas apparatus 400 can be part of a peripheral device coupled with the host machine via interconnect 418. In some examples, system 500 and apparatus 400 may be located in different machines.

Figure 5A:
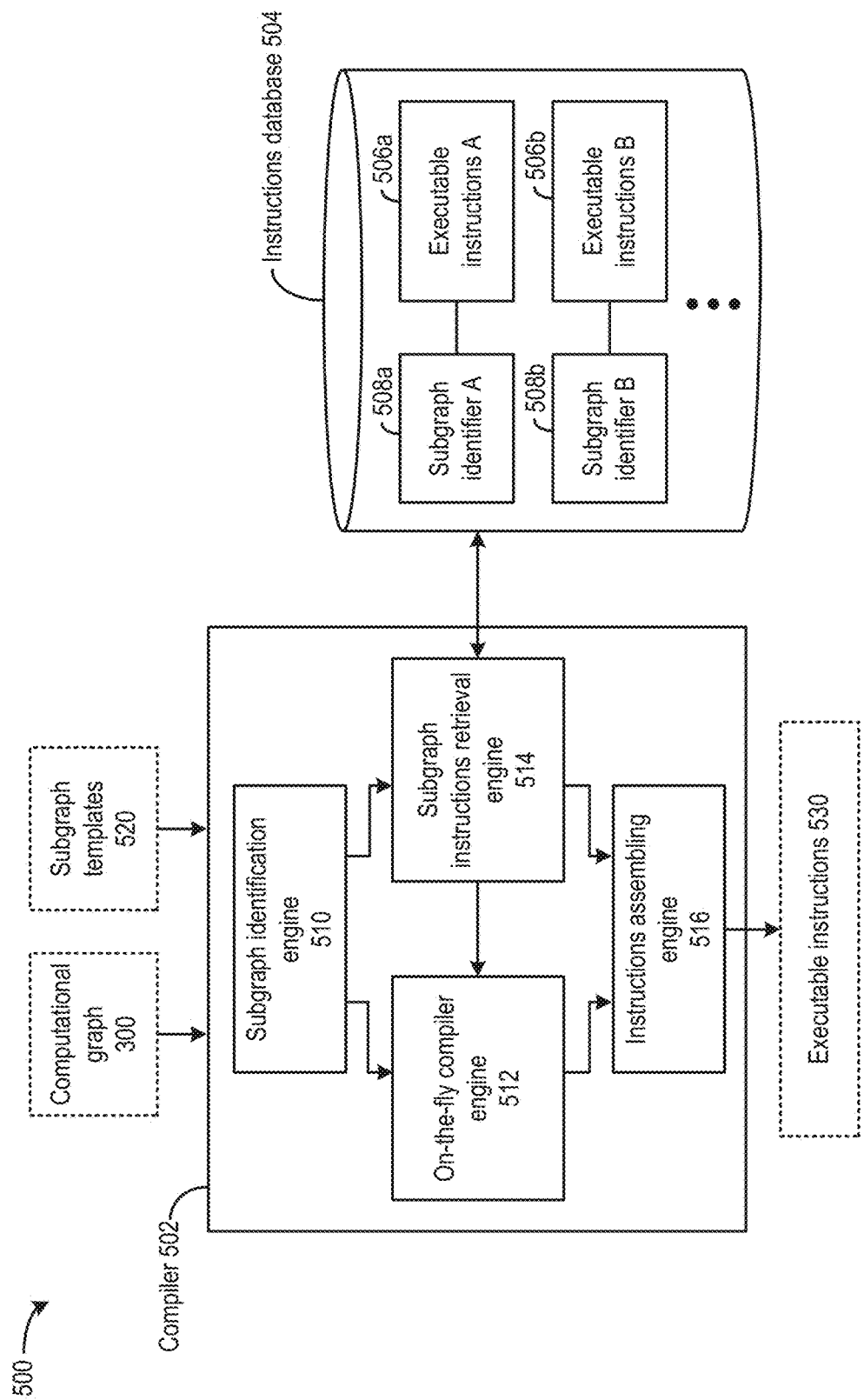
FIGS. 5A-5E illustrate examples of a system and its operations to provide executable instructions to the neural network processor of FIG. 4, according to certain aspects of the present disclosure.

As shown in FIG. 5A, system 500 includes a compiler 502 and an instructions database 504. Instructions database 504 can store instructions 506, including instructions 506a and 506b, that are previously generated for different computational subgraphs. The instructions can be optimized instructions generated by human experts, machine learning operations, etc. Instruction database 504 further stores subgraph identifiers 508, including subgraph identifiers 508a and 508b. Each subgraph identifier can be associated with (or identify) a computational subgraph and the instructions generated for the subgraph. For example, as shown in FIG. 5A, subgraph identifier 508a is associated with instructions 506a, whereas subgraph identifier 508b is associated with instructions 506b. As to be discussed in more details below, a subgraph identifier can be computed based on the types of computation operations of the nodes, the edges, as well as the input and output dimensions of the computational subgraph associated with the identifier, such that different subgraphs having nodes, edges, input and/or output dimensions can be distinguishable by the identifiers.

Moreover, compiler 502 includes a subgraph identification engine 510, an on-the-fly compiler engine 512, a subgraph instructions retrieval engine 514, and an instructions assembling engine 516.

Subgraph identification engine 510 can receive data representing a computational graph (e.g., computational graph 300 as shown in FIG. 5A) as well as subgraph templates 520 from, for example, a memory device, an application, etc. Subgraph templates 520 can include topology information of computational subgraphs of which instructions are stored in instructions database 504. A subgraph template may include a topology of nodes connected by edges and representing a certain sequence of computation operations of various types. Subgraph identification engine 510 can traverse the computational graph and identify a subgraph comprising nodes and edges and having topologies that match the subgraph templates, and provide the identified subgraph to subgraph instructions retrieval engine 514.

Subgraph instructions retrieval engine 514 can search for instructions associated with the identified subgraph in instructions database 504. As part of the search, subgraph instructions retrieval engine 514 can compute an identifier of the identified subgraph using the same method as the computation of the identifiers stored in instructions database 504. Subgraph instructions retrieval engine 514 can search for a matching identifier in instructions database 504. If a matching identifier is found in instructions database 504 (e.g., subgraph identifier 508a), subgraph instructions retrieval engine 514 can retrieve the associated executable instructions (e.g., instructions 506a) from subgraph instructions retrieval engine 514, and provide the retrieved instructions to instructions assembling engine 516. Instructions assembling engine 516 can assemble a set of executable instructions 530 implementing computational graph 300 including the instructions retrieved from instructions database 504. Meanwhile, subgraph identification engine 510 can continue the traversal of the computational graph to identify additional computational subgraphs, and subgraph instructions retrieval engine 514 can retrieve additional instructions from instructions database 504 based on the identified subgraphs, until the traversal of the computational graph completes.

In a case where subgraph identification engine 510 cannot identify a subgraph having a matching topology as subgraph templates 520, or where subgraph instructions retrieval engine 514 cannot find the identified computational subgraph in the instructions database 504, on-the-fly compiler engine 512 can parse the computational graph or the identified computational subgraph, and decompose the computational operations included in the graph/subgraph into primitive instructions, and provide the primitive instructions to instructions assembling engine 516 to be included in executable instructions 530.

Figure 5B:
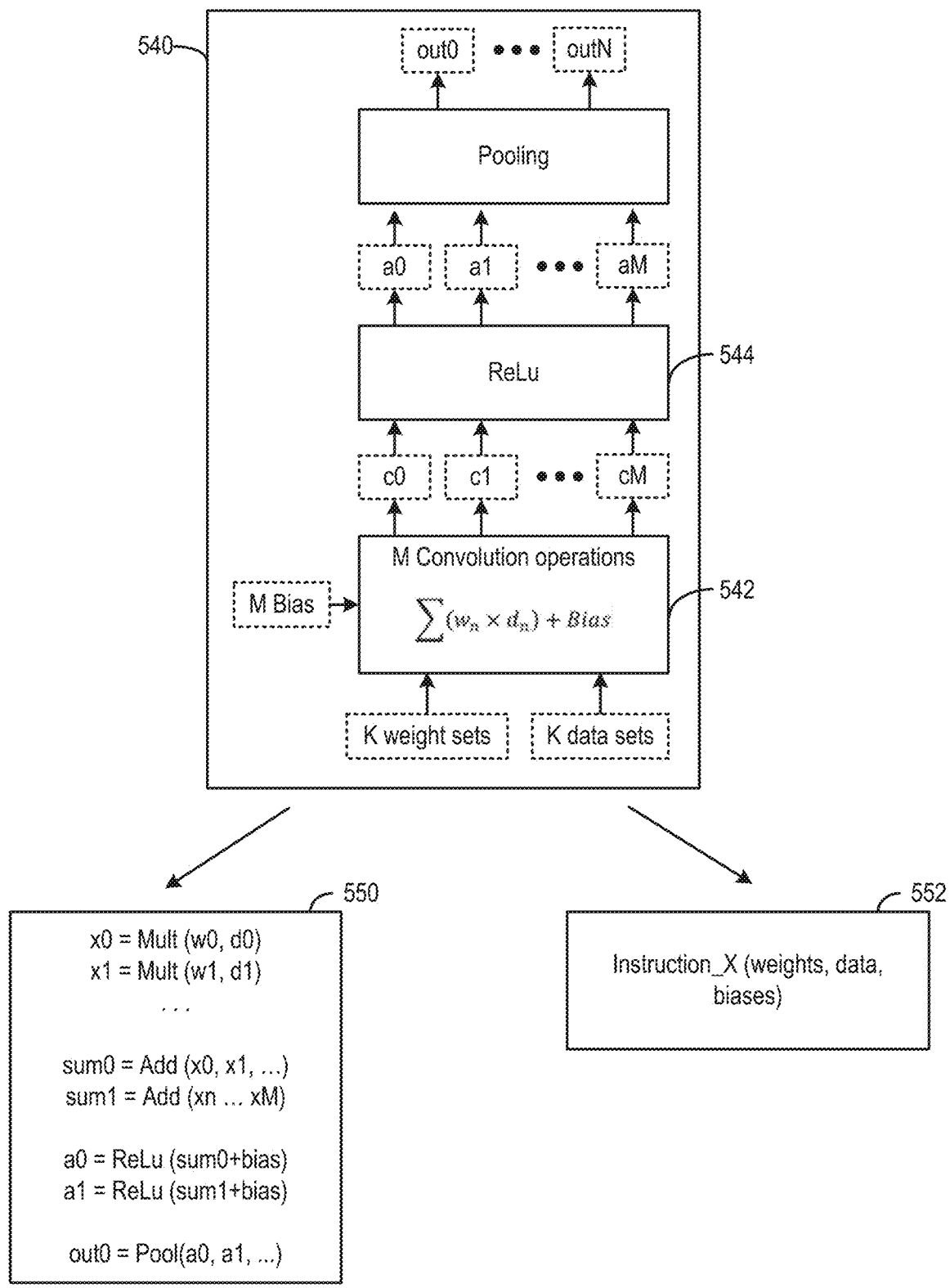

FIG. 5B illustrates an example of instructions that can be provided to instructions assembling engine 516 for a computational subgraph 540. As shown in FIG. 5B, computational subgraph 540 may include a node 542 representing M convolution operations and bias additions on K weight sets and K data sets to generate M convolution outputs (e.g., c0, . . . cM), a node 544 representing ReLu operations on the M convolution outputs to generate M activation function outputs (e.g., a0, . . . aM), and a node 546 representing pooling operations to shrink the number of activation function outputs from M to N (e.g., out0, . . . outN). In a case where computational subgraph 540 does not have the same topology as any of subgraph templates 520, or where computational subgraph 540 is not found in instructions database 504, on-the-fly compiler engine 512 can decompose the computation operations of each nodes of computational subgraph 540 into primitive instructions 550. For example, the convolution operations of node 542 can be decomposed into a set of multiplication and addition instructions (e.g., "Mult" and "Add") targeted at computing engine 424, followed by instructions representing activation function processing ("ReLu"), as well as instructions representing pooling operations ("Pool"). In a case where computational subgraph 540 is found in instructions database 504, an optimized instruction 552 can be retrieved from instructions database 504. In some examples, optimized instruction 552 may be a single instruction comprising a set of instructions that provide optimized scheduling and mapping of hardware resources for the computation operations of computational subgraph 540, such that the neural network processor can execute instruction 552 at a higher efficiency than instructions 550.

Figure 5C:
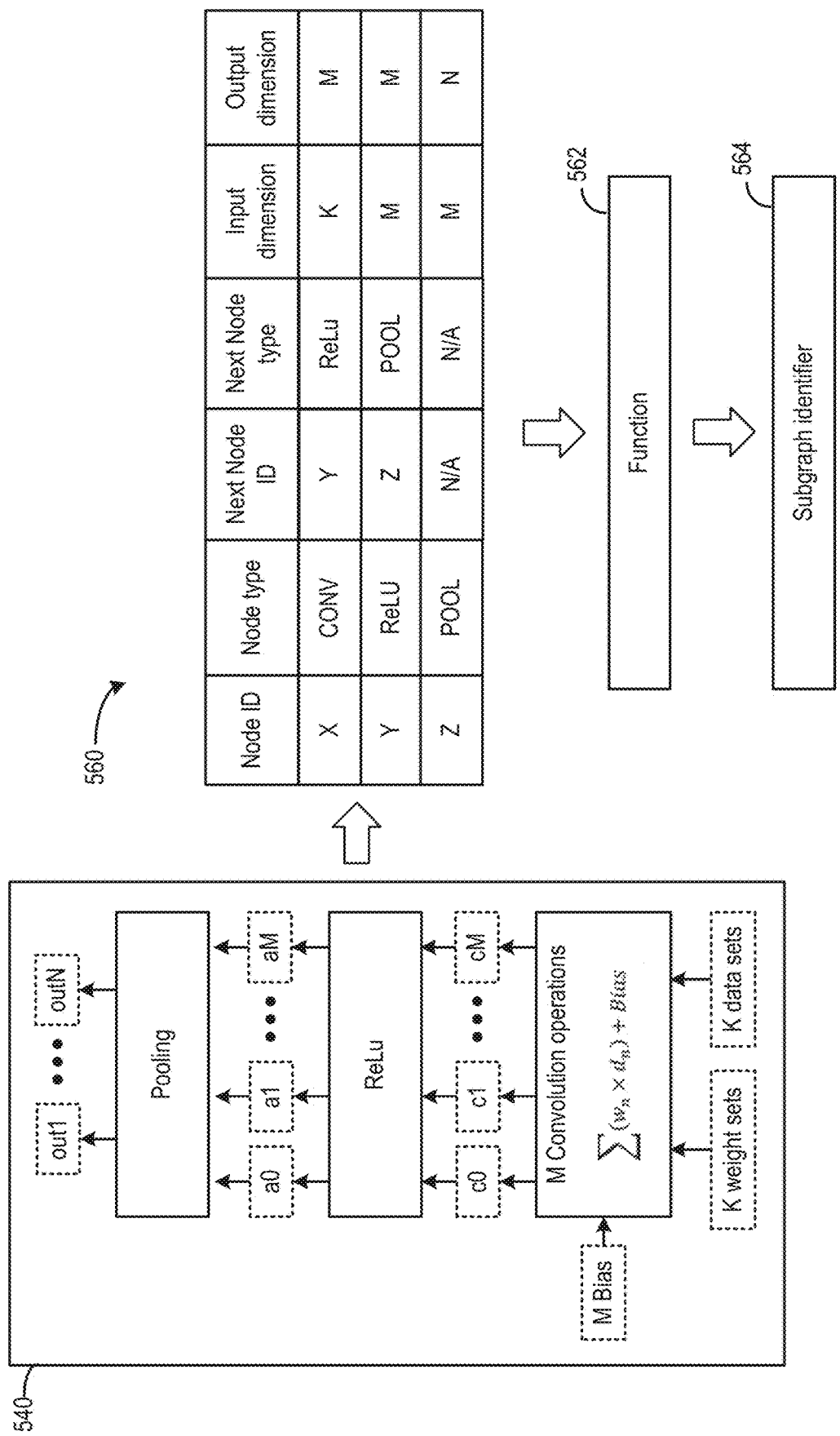

FIG. 5C illustrates an example of operations for computing the identifier of a computational subgraph. As shown in FIG. 5C, the topology of computational subgraph 540 can be represented in a table 560. Each row of table 560 can correspond to a node (or a groups of nodes within the same hierarchy level) of computational subgraph 540. Each row can indicate an identifier of the node, a type of the node (which can be based on the type of computation operations of the node), an identifier of the next node the node is connected to, the type of the next node, an input dimension of the node, and an output dimension of the node. Each entry of table 560 can be assigned a number based on the value of the entry. The numbers can reflect the topology of computational subgraph 540 (e.g., the sequence of computation operations represented in the subgraph, the number of inputs and outputs, etc.), but the numbers are not affected by, for example, the input data and weight values that are provided to a particular instance of computational subgraph 540. The numbers be processed by a function 562, such as a hash function, to generate a subgraph identifier 564 that identifies computational subgraph 540. The identifier computation operations of FIG. 5C can be performed for each computational subgraph of which instructions are stored in instructions database 504, subgraph instructions retrieval 514 can employ the same identifier computation operations to compute an identifier, and use the identifier to search for a computation subgraph identified by subgraph identification engine 510.

Figure 5D:
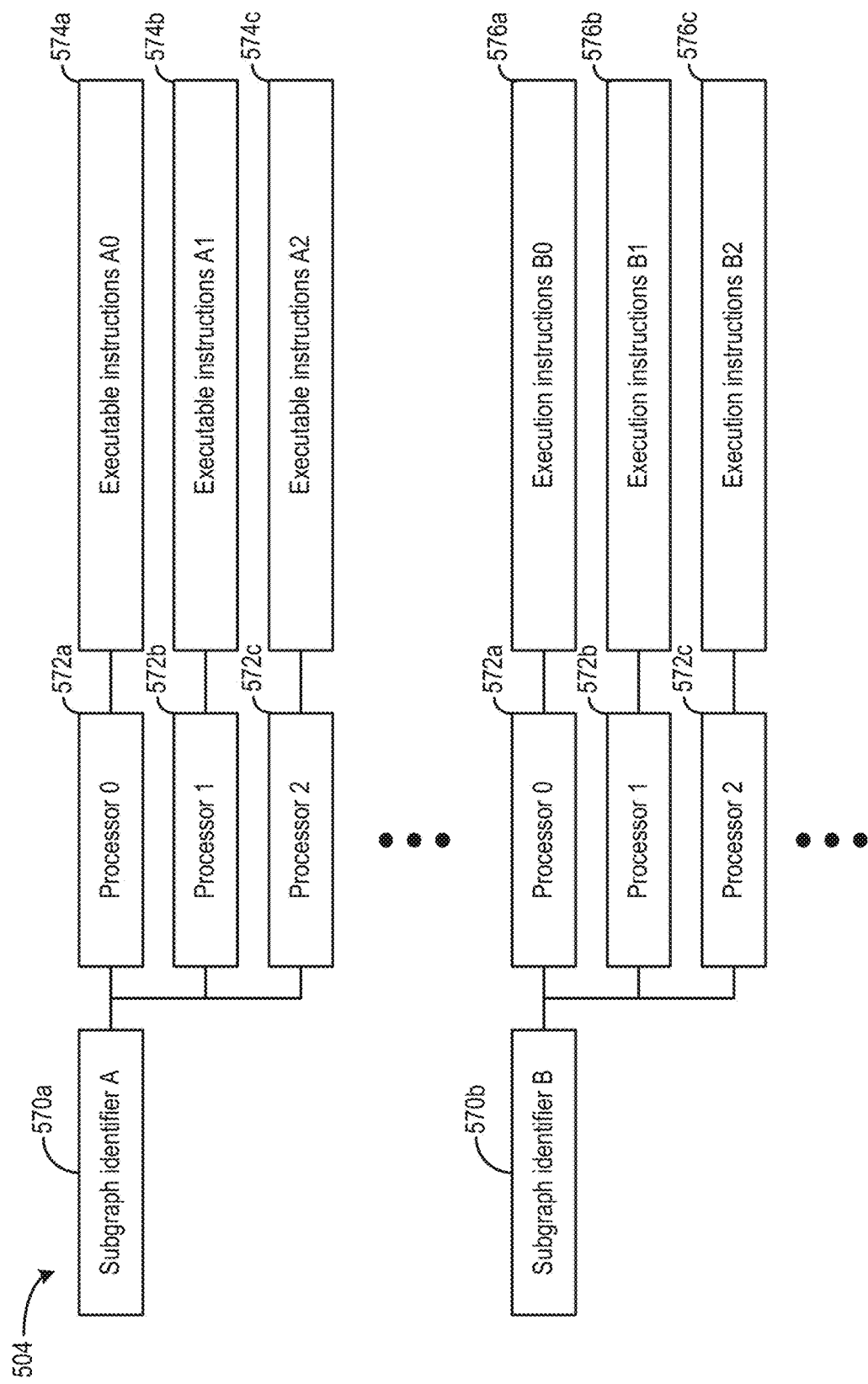
Figure 5E:
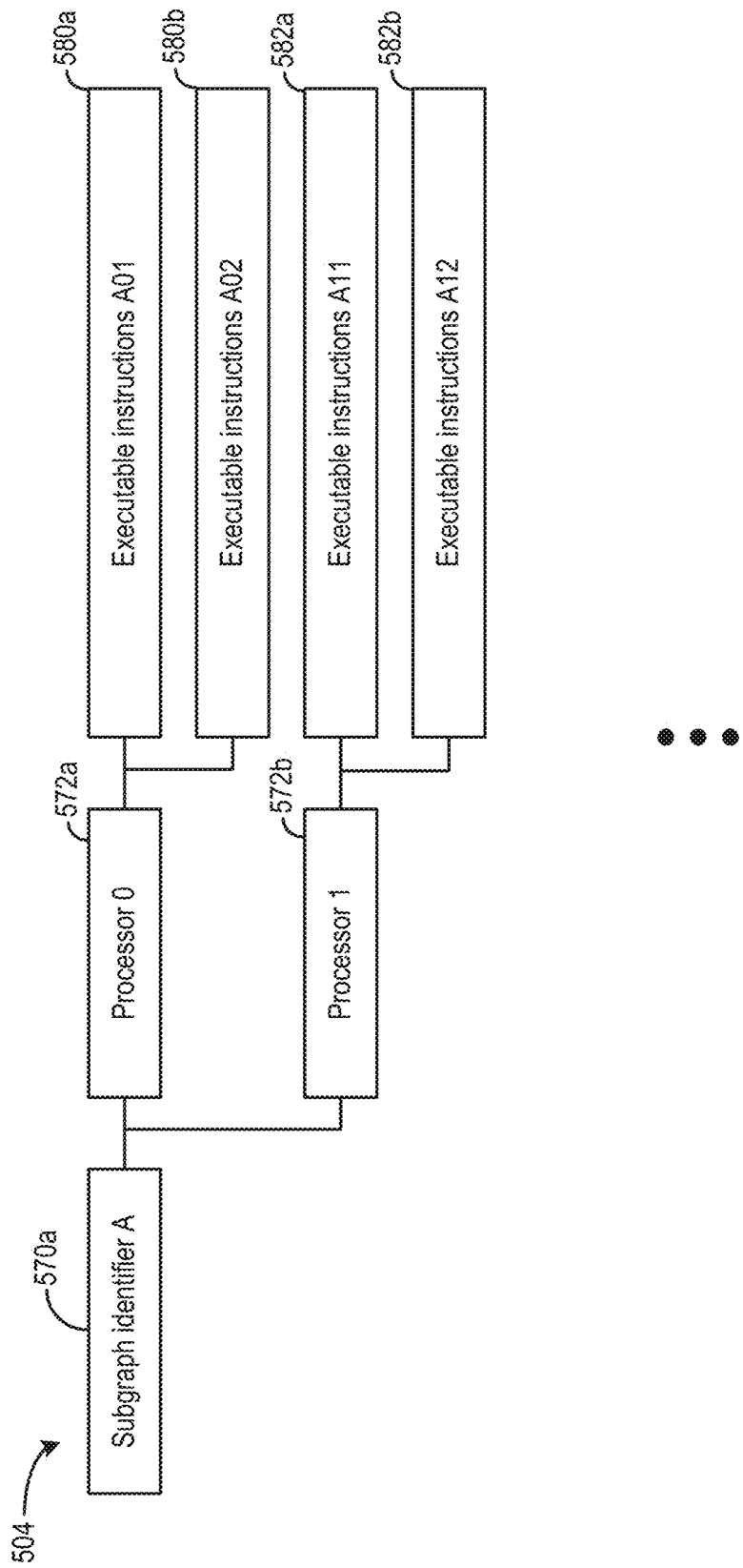

FIG. 5D and FIG. 5E illustrate other examples of instructions database 504. As shown in FIG. 5D, instructions database 504 can store subgraph identifiers 570 (e.g., subgraph identifiers 570a and 570b), processor identifiers 572 (e.g., processor identifiers 572a, 572b, and 572c), and executable instructions 574 and 576 (e.g., executable instructions 574a-574c, 576a-576c). Processor identifiers 572 can be used to identify neural network processors of different models, architectures, vendors, etc. In instructions database 504 of FIG. 5D, a subgraph identifier can be associated with multiple sets of executable instructions, with each set of executable instructions being optimized for a particular model of neural network processor. To retrieve instructions from instructions database 504 of FIG. 5D, subgraph instructions retrieval engine 514 can provide a subgraph identifier, as well as a processor identifier of the neural network processor to perform the computations of the subgraph, to instructions database 504, which can locate the instructions based on the subgraph identifier and the processor identifier.

Moreover, in some examples of instructions database 504, for each subgraph identifier and a neural network processor, there can be multiple sets of executable instructions. For example, as shown in FIG. 5E, subgraph identifier 570a is associated with processor identifiers 572a and 572b, and each processor identifier is further associated with two sets of executable instructions. For example, processor identifier 572a is associated with executable instructions 580a and 580b, whereas processor identifier 572b is associated with executable instructions 582a and 582b. Both executable instructions 580a and 580b are executable on a neural network processor with processor identifier 572a to perform the computations of a computational subgraph with subgraph identifier 570a, but differ in various aspects, such as execution efficiency, cost, accessibility, etc. To retrieve instructions from instructions database 504 of FIG. 5D, subgraph instructions retrieval engine 514 can provide a subgraph identifier, a processor identifier, as well as additional information (e.g., credential information, allowed cost, etc.) to instructions database 504, which can locate the instructions based on the subgraph identifier, the processor identifier, and the additional information.

Figure 6:
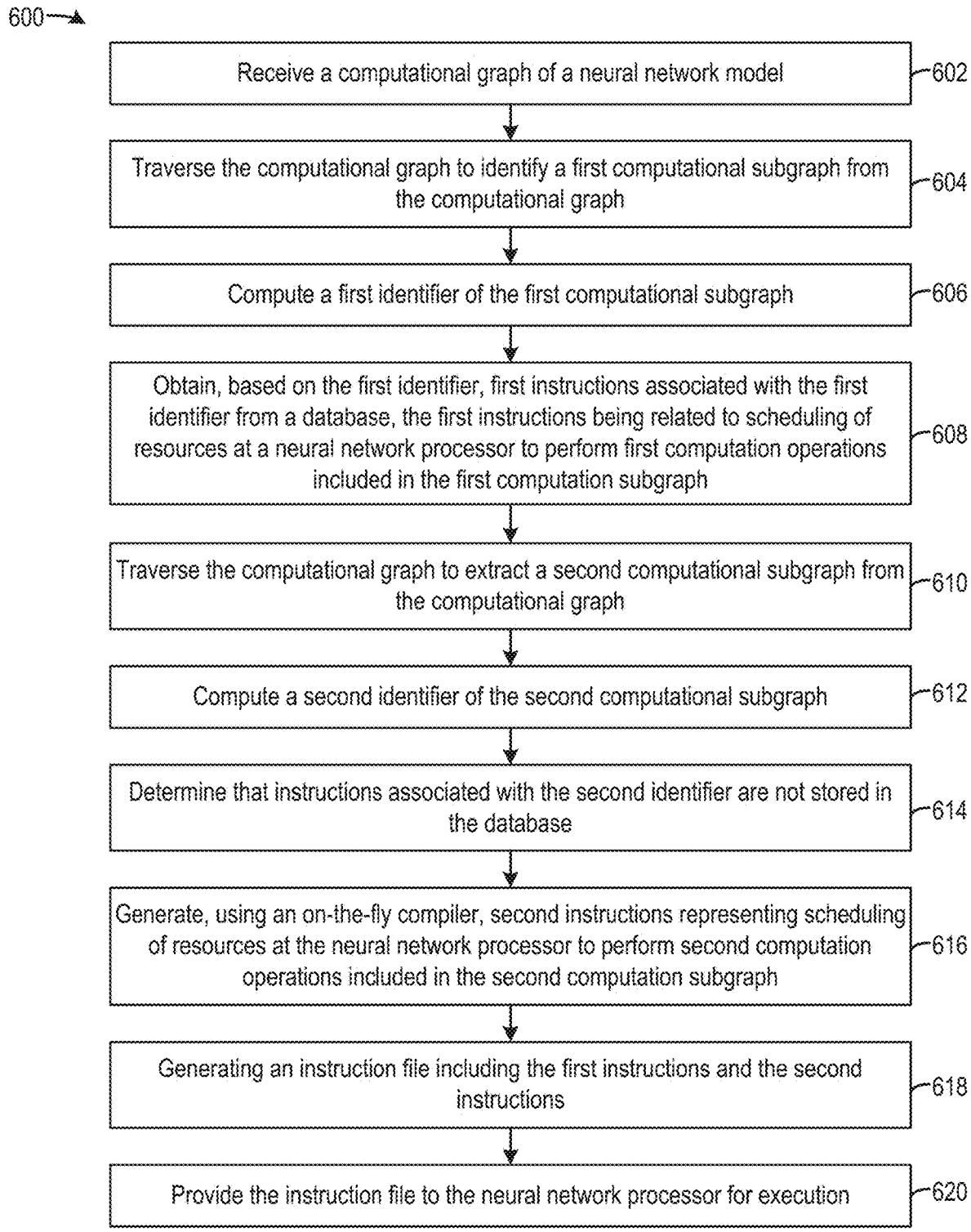
FIG. 6 illustrates an example method of preparing instructions representing a neural network computational graph for execution on a neural network processor, according to certain aspects of the present disclosure.

FIG. 6 illustrates an example flow diagram of a process 600 for preparing instructions representing a neural network computational graph for execution on a neural network processor. Process 600 can be performed by, for example, various internal components of system 500 as described in FIG. 5A-FIG. 5E including, for example, compiler 502 and instructions database 504, and may include the techniques described above.

At operation 602, subgraph identification engine 510 may receive a computational graph of a neural network model. The computational graph may represent a sequence of computation operations to be performed at a neural network to support an application (e.g., application 102).

At operation 604, subgraph identification engine 510 may traverse the computational graph to identify a first computational subgraph from the computational graph. In some examples, subgraph identification engine 510 may receive a subgraph template (e.g., subgraph template 520) which includes topology information (e.g., nodes included in the subgraph, connectivity between the nodes, etc.), and subgraph identification engine 510 can identify the first computational subgraph based on the topology of the subgraph matching the subgraph template.

At operation 606, subgraph instructions retrieval engine 514 may compute a first identifier of the first computational subgraph. In some examples, as described in FIG. 5C, subgraph instructions retrieval engine 514 may determine, for each node, a type of the node, identity and type of other node connected to the node, input and output dimension of the node, etc., and determine the subgraph identifier based on these information. In some examples, a hash function can be used to generate a hash value based on these information, and the subgraph identifier can be based on the hash value.

At operation 608, subgraph instructions retrieval engine 514 may obtain, based on the first identifier, first instructions associated with the first identifier from a database, the first instructions being related to scheduling of resources at a neural network processor to perform first computation operations included in the first computation subgraph. The database may include a set of subgraph identifiers, with each subgraph identifier being linked/associated with one or more sets of executable instructions, as described in FIGS. 5A, 5D, and 5E. The first instructions can be identified based on the associated first identifier in the database. The first instructions may be provided/generated by a human expert, a machine learning process, etc., and can coordinate the hardware resources of the neural network processor to perform the first computation operations. The first instructions can be optimized for higher execution efficiency at the neural network processor.

At operation 610, subgraph identification engine 510 may traverse the computational graph to identify a second computational subgraph from the computational graph. The identification of the second computational subgraph can be based on topology information included in the subgraph template, as described above.

At operation 612, subgraph identification engine 510 may compute a second identifier of the second computational subgraph. The computation of the second identifier can be based on the techniques of FIG. 5C, as described above.

At operation 614, subgraph identification engine 510 may search for the second identifier in the database. Subgraph identification engine 510 may determine that the second identifier is not found in the database, and determine that instructions associated with the second identifier are not stored in the database.

At operation 616, based on the determination that instructions associated with the second identifier are not stored in the database, on-the-fly compiler engine 512 can be triggered to generate second instructions for the second computational subgraph. The second instructions may represent scheduling of resources at the neural network processor to perform second computation operations included in the second computation subgraph. The second instructions may be generated by, for example, decomposing the computation operations included in the second computation subgraph into primitive instructions (e.g., additions, multiplications, etc.) targeted at various hardware resources of the neural network processor.

At operation 618, instructions assembling engine 516 can include the first and second instructions in an instruction file. The system can provide the instruction file to the neural network processor for execution, at operation 620.

Figure 7:
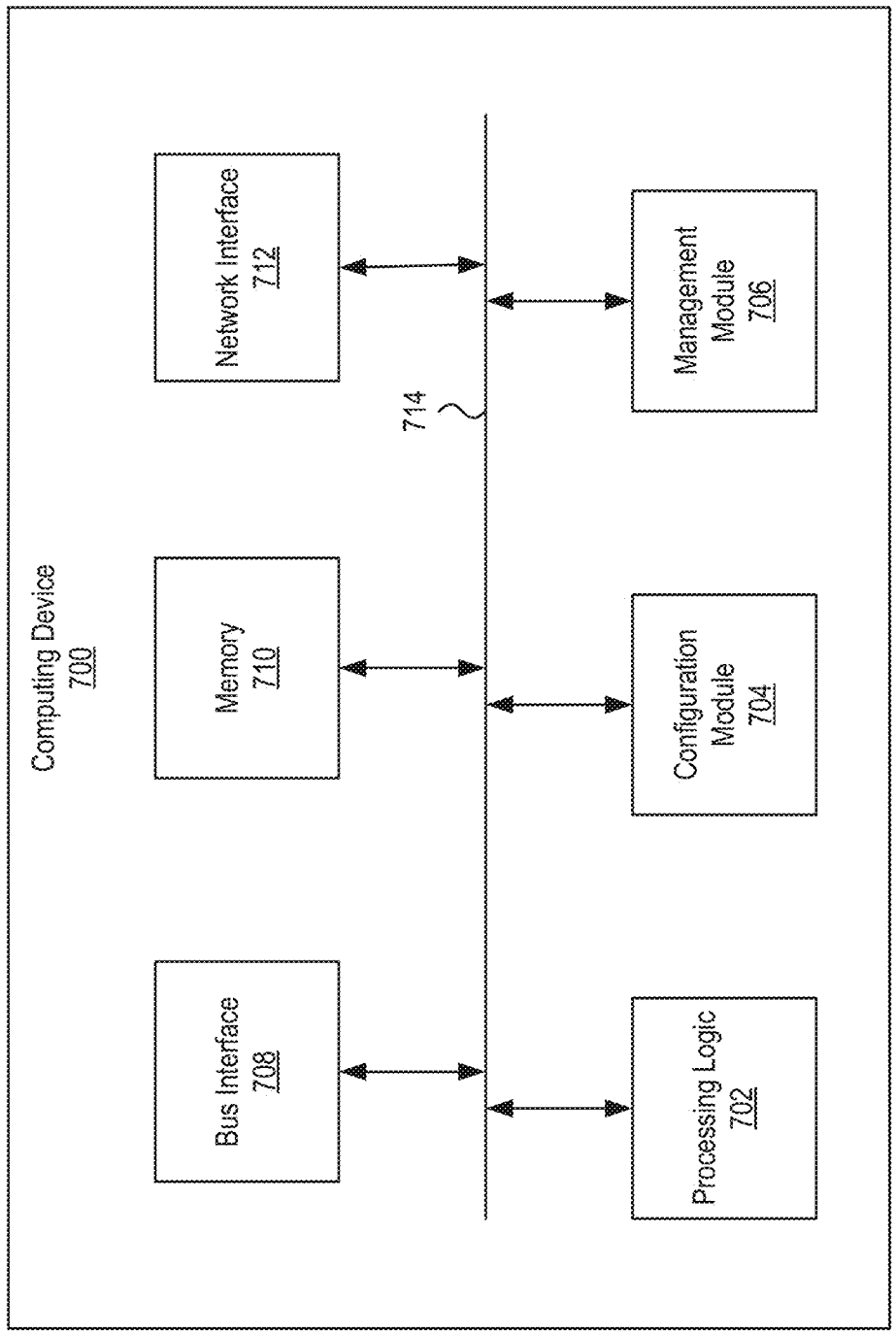
FIG. 7 illustrates an example of a computing device, according to certain aspects of the disclosure.

FIG. 7 illustrates an example of a computing device 700. Functionality and/or several components of the computing device 700 may be used without limitation with other embodiments disclosed elsewhere in this disclosure, without limitations. A computing device 800 may perform computations to facilitate processing of a task. As an illustrative example, computing device 800 can be part of a server in a multi-tenant compute service system. Various hardware and software resources of computing device 700 (e.g., the hardware and software resources associated with provision of an image recognition service) can be allocated to a client upon request.

In one example, the computing device 700 may include processing logic 702, a bus interface module 708, memory 710, and a network interface module 712. These modules may be hardware modules, software modules, or a combination of hardware and software. In certain instances, modules may be interchangeably used with components or engines, without deviating from the scope of the disclosure. The computing device 700 may include additional modules, not illustrated here. In some implementations, the computing device 700 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing logic 702 may include one or more integrated circuits, which may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 702 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 710. Processing logic 702 may also include hardware circuities for performing artificial neural network computation including, for example, neural network processor(s) 402, etc.

The access to processing logic 702 can be granted to a client to provide the personal assistant service requested by the client. For example, computing device 700 may host a virtual machine, on which an image recognition software application can be executed. The image recognition software application, upon execution, may access processing logic 702 to predict, for example, an object included in an image. As another example, access to processing logic 702 can also be granted as part of bare-metal instance, in which an image recognition software application executing on a client device (e.g., a remote computer, a smart phone, etc.) can directly access processing logic 702 to perform the recognition of an image.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 710 may be internal to the computing device 700, while in other cases some or all of the memory may be external to the computing device 700. The memory 710 may store an operating system comprising executable instructions that, when executed by the processing logic 702, provides the execution environment for executing instructions providing networking functionality for the computing device 700. The memory 710 may also store, for example, software applications for performing artificial neural network computation. For example, memory 710 may store software routines related to the computations of the equations above. In a case where processing logic 702 is in the form of FPGA, memory 710 may store netlists data representing various logic circuit components of processing logic 702. In some examples, memory 710 can include memory 412.

The bus interface module 708 may enable communication with external entities, such as a host device and/or other components in a computing system, over an external communication medium. The bus interface module 708 may include a physical interface for connecting to a cable, socket, port, or other connection to the external communication medium. The bus interface module 708 may further include hardware and/or software to manage incoming and outgoing transactions. The bus interface module 708 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 808 may include the physical layer for any of these bus protocols, including a connector, power management, and error handling, among other things. In some implementations, the computing device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors or physical ports for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 700 may include multiple network interface modules, each configured to communicate with a different network. For example, in these implementations, the computing device 700 may include a network interface module for communicating with a wired Ethernet network, a wireless 802.11 network, a cellular network, an Infiniband network, etc. In some embodiments, computing device 700 may receive a set of parameters, such as the aforementioned weight vectors for generation of forget gate factor, input factor, output factor, etc. from a server through network interface module 712.

The various components and modules of the computing device 700, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed herein.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the figures and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system comprising:
a database that stores subsets of executable instructions, wherein each subset of the subsets of executable instructions is associated with one of a plurality of subgraph identifiers and one of a plurality of processor identifiers; and
one or more processors; and
a non-transitory computer-readable medium storing a compiler that, when executed by the one or more processors, causes the compiler to:
receive a computational graph to be executed on a processor;
determine a subgraph identifier of a computational subgraph from the computational graph;
determine a processor identifier of the processor;
retrieve, from the database, instructions from one of the subsets of executable instructions associated with both the subgraph identifier and the processor identifier, the instructions having been stored in the database prior to the compiler receiving the computational graph; and
provide the instructions for execution by the processor.

2. The system of claim 1, wherein the computational graph represents a sequence of computation operations to be performed for a neural network model, and wherein the processor is a neural network processor.

3. The system of claim 1, wherein executing the compiler further causes the compiler to:
traverse the computational graph to identify the computational subgraph.

4. The system of claim 1, wherein executing the compiler further causes the compiler to:
determine whether the subgraph identifier is included in the plurality of subgraph identifiers stored in the database and the processor identifier is included in the plurality of processor identifiers stored in the database.

5. The system of claim 1, wherein the instructions represent a scheduling of resources at the processor to perform computation operations included in the computational subgraph.

6. The system of claim 1, wherein executing the compiler further causes the compiler to:
determine a second subgraph identifier of a second computational subgraph from the computational graph, wherein the subgraph identifier is a first subgraph identifier, and wherein the computational subgraph is a first computational subgraph;
retrieve, from the database, second instructions from one of the subsets of executable instructions associated with both the second subgraph identifier and the processor identifier, wherein the instructions are first instructions; and
provide the second instructions for execution by the processor.

7. The system of claim 6, wherein executing the compiler further causes the compiler to:
generate an instruction file including the first instructions and the second instructions.

8. A non-transitory computer-readable media having a set of instructions that, when executed by one or more processors, cause the one or more processors to execute a compiler, wherein the compiler is configured to:
receive a computational graph to be executed on a processor;
determine a subgraph identifier of a computational subgraph from the computational graph;
determine a processor identifier of the processor;
retrieve, from a database storing subsets of executable instructions, instructions from one of the subsets of executable instructions associated with both the subgraph identifier and the processor identifier, wherein each subset of the subsets of executable instructions is associated with one of a plurality of subgraph identifiers and one of a plurality of processor identifiers, the instructions having been stored in the database prior to the compiler receiving the computational graph; and
provide the instructions for execution by the processor.

9. The non-transitory computer-readable media of claim 8, wherein the computational graph represents a sequence of computation operations to be performed for a neural network model, and wherein the processor is a neural network processor.

10. The non-transitory computer-readable media of claim 8, wherein the compiler is further configured to:
traverse the computational graph to identify the computational subgraph.

11. The non-transitory computer-readable media of claim 8, wherein the compiler is further configured to:
determine whether the subgraph identifier is included in the plurality of subgraph identifiers stored in the database and the processor identifier is included in the plurality of processor identifiers stored in the database.

12. The non-transitory computer-readable media of claim 8, wherein the instructions represent a scheduling of resources at the processor to perform computation operations included in the computational subgraph.

13. The non-transitory computer-readable media of claim 8, wherein the compiler is further configured to:
determine a second subgraph identifier of a second computational subgraph from the computational graph, wherein the subgraph identifier is a first subgraph identifier, and wherein the computational subgraph is a first computational subgraph;

retrieve, from the database, second instructions from one of the subsets of executable instructions associated with both the second subgraph identifier and the processor identifier, wherein the instructions are first instructions; and provide the second instructions for execution by the processor.

14. The non-transitory computer-readable media of claim 13, wherein the compiler is further configured to:

generate an instruction file including the first instructions and the second instructions.

15. A method comprising:

receiving a computational graph to be executed on a processor;

determining a subgraph identifier of a computational subgraph from the computational graph;

determining a processor identifier of the processor;

retrieving, from a database storing subsets of executable instructions, instructions from one of the subsets of executable instructions associated with both the subgraph identifier and the processor identifier, wherein the database, wherein each subset of the subsets of executable instructions is associated with one of a plurality of subgraph identifiers and one of a plurality of processor identifiers, the instructions having been stored in the database prior to the receiving the computational graph; and providing the instructions for execution by the processor.

16. The method of claim 15, wherein the computational graph represents a sequence of computation operations to be performed for a neural network model, and wherein the processor is a neural network processor.

17. The method of claim 15, further comprising:

traversing the computational graph to identify the computational subgraph.

18. The method of claim 15, further comprising:

determining whether the subgraph identifier is included in the plurality of subgraph identifiers stored in the database and the processor identifier is included in the plurality of processor identifiers stored in the database.

19. The method of claim 15, further comprising:

determining a second subgraph identifier of a second computational subgraph from the computational graph, wherein the subgraph identifier is a first subgraph identifier, and wherein the computational subgraph is a first computational subgraph;

retrieving, from the database, second instructions from one of the subsets of executable instructions associated with both the second subgraph identifier and the processor identifier, wherein the instructions are first instructions; and providing the second instructions for execution by the processor.

20. The method of claim 19, further comprising:

generating an instruction file including the first instructions and the second instructions.

* * * * *

UNITED STATES PATENT AND TRADEMARK OFFICE
CERTIFICATE OF CORRECTION

PATENT NO. : 12,093,801 B1
APPLICATION NO. : 18/142952
DATED : September 17, 2024
INVENTOR(S) : Richard John Heaton et al.

Page 1 of 1

It is certified that error appears in the above-identified patent and that said Letters Patent is hereby corrected as shown below:

In the Claims

Claim 15 - Column 23 Lines 22-23:
Delete: "wherein the database,"

Signed and Sealed this
Thirtieth Day of December, 2025

John A. Squires
*Director of the United States Patent and Trademark Office*